United States Patent
Ellingson et al.

(10) Patent No.: US 12,277,716 B2
(45) Date of Patent: Apr. 15, 2025

(54) COOPERATIVE AIRCRAFT NAVIGATION

(71) Applicant: Brigham Young University, Provo, UT (US)

(72) Inventors: Gary Ellingson, Ogden, UT (US); Timothy McLain, Provo, UT (US); Kevin Brink, Dayton, OH (US)

(*) Notice: Subject to any disclaimer, the term of this patent is extended or adjusted under 35 U.S.C. 154(b) by 314 days.

(21) Appl. No.: 17/228,697

(22) Filed: Apr. 12, 2021

(65) Prior Publication Data

US 2021/0319568 A1    Oct. 14, 2021

Related U.S. Application Data

(60) Provisional application No. 63/008,462, filed on Apr. 10, 2020.

(51) Int. Cl.
| | |
|---|---|
| G06T 7/246 | (2017.01) |
| B64D 47/08 | (2006.01) |
| B64U 20/87 | (2023.01) |
| G01C 21/20 | (2006.01) |
| G05D 1/00 | (2024.01) |
| G06T 7/277 | (2017.01) |

(Continued)

(52) U.S. Cl.
CPC .............. *G06T 7/248* (2017.01); *B64D 47/08* (2013.01); *B64U 20/87* (2023.01); *G01C 21/20* (2013.01); *G05D 1/101* (2013.01); *G06T 7/251* (2017.01); *G06T 7/277* (2017.01); *G06T 7/73* (2017.01); *G08G 5/0008* (2013.01); *G08G 5/0069* (2013.01); *G06T 2207/10032* (2013.01); *G06T 2207/20072* (2013.01); *G06T 2207/30181* (2013.01)

(58) Field of Classification Search
None
See application file for complete search history.

(56) References Cited

U.S. PATENT DOCUMENTS

| | | | |
|---|---|---|---|
| 2014/0375493 A1* | 12/2014 | Weisenburger | G01S 19/47 342/357.3 |
| 2019/0026943 A1* | 1/2019 | Yan | G06T 7/344 |

(Continued)

FOREIGN PATENT DOCUMENTS

WO    WO-2014190208 A2 *    11/2014    ............ B25J 9/1664

OTHER PUBLICATIONS

"Relative navigation of fixed-wing aircraft in GPS-denied environments" by Gary Ellingson, Kevin Brink and Tim McLain, Navigation: Journal of the Institute of Navigation Jun. 2020, 67 (2) 255-273; DOI: https://doi.org/10.1002/navi.364 (Year: 2020).*

(Continued)

*Primary Examiner* — Angela Y Ortiz
*Assistant Examiner* — Charles Pall
(74) *Attorney, Agent, or Firm* — Shapiro IP Law; Joseph Shapiro

(57) ABSTRACT

A UAS may use camera-captured ground feature data to iteratively estimate pose change through a Kalman filter. To avoid excessive drift, the UAS may periodically perform a reset by publishing delta pose and covariance as an edge in a global pose graph, by zeroing out the delta pose and covariance. To further improve global pose estimation, two UASs may share range information and associated pose graph information, thereby providing an additional constraint for each UAS to use in its pose graph optimization.

5 Claims, 12 Drawing Sheets

(51) Int. Cl.
    *G06T 7/73*     (2017.01)
    *G08G 5/00*     (2006.01)

(56) References Cited

U.S. PATENT DOCUMENTS

2020/0356096 A1* 11/2020 Leeb .................... G05D 1/0278
2022/0377261 A1* 11/2022 Whitely ................. G01S 17/08

OTHER PUBLICATIONS

Shrit Omar Shrit, Steven Martin, Khaldoun Al Agha, Guy Pujolle. A new approach to realize drone swarm using ad-hoc network. 2017 16th Annual Mediterranean Ad Hoc Networking Workshop (Med-HocNet), Jun. 2017, Budva, Montenegro. 10.1109/MedHocNet. 2017.8001645 . hal-01696735 (Year: 2017).*

Holsinger, S., "Multiple Target Tracking Via Dynamic Point Clustering on a UAV Platform" (Nov. 18, 2018) (M. Sc. thesis, University of Cincinnati) (on file with the Harvard University Library), retrieved Mar. 8, 2023. (Year: 2018).*

Multiplicative Extended Kalman Filter for Relative Rotorcraft Navigation Robert C. Leishman and Timothy W. McLain Journal of Aerospace Information Systems 2015 12:12, 728-744. (Year: 2015).*

* cited by examiner

| Time | $U_1: (\Delta_x, \Delta y, \Delta_\psi, \sigma^2)$ | $U_2: (\Delta_x, \Delta y, \Delta_\psi, \sigma^2)$ | New $U_1$ Edges | New $U_2$ Edges |
|---|---|---|---|---|
| $t_1$ | $(\emptyset,\emptyset,\emptyset,[\emptyset]) \rightarrow (0,0,0,[0])$ | $(\emptyset,\emptyset,\emptyset,[\emptyset])$ | $E_{1-1}$ | |
| $t_2$ | $(\emptyset,\emptyset,\emptyset,[\emptyset])$ | $(\emptyset,\emptyset,\emptyset,[\emptyset]) \rightarrow (0,0,0,[0])$ | | $E_{2-1}$ |
| $t_3$ | $(\emptyset,\emptyset,\emptyset,[\emptyset])$ | $(\emptyset,\emptyset,\emptyset,[\emptyset]) \rightarrow (0,0,0,[0])$ | | $E_{2-2}$ |
| $t_4$ | $(\emptyset,\emptyset,\emptyset,[\emptyset]) \rightarrow (0,0,0,[0])$ | $(\emptyset,\emptyset,\emptyset,[\emptyset]) \rightarrow (0,0,0,[0])$ | $E_{1-2}$ $R_{1-1}$ | $E_{2-3}$ $R_{1-1}$ |
| $t_5$ | $(\emptyset,\emptyset,\emptyset,[\emptyset]) \rightarrow (0,0,0,[0])$ | $(\emptyset,\emptyset,\emptyset,[\emptyset])$ | $E_{1-3}$ | |
| $t_6$ | $(\emptyset,\emptyset,\emptyset,[\emptyset]) \rightarrow (0,0,0,[0])$ | $(\emptyset,\emptyset,\emptyset,[\emptyset])$ | $E_{1-4}$ | |
| $t_7$ | $(\emptyset,\emptyset,\emptyset,[\emptyset]) \rightarrow (0,0,0,[0])$ | $(\emptyset,\emptyset,\emptyset,[\emptyset]) \rightarrow (0,0,0,[0])$ | $E_{1-5}$ $R_{1-2}$ | $E_{2-4}$ $R_{1-2}$ |
| $t_8$ | $(\emptyset,\emptyset,\emptyset,[\emptyset])$ | $(\emptyset,\emptyset,\emptyset,[\emptyset]) \rightarrow (0,0,0,[0])$ | | $E_{2-5}$ |
| $t_9$ | $(\emptyset,\emptyset,\emptyset,[\emptyset]) \rightarrow (0,0,0,[0])$ | $(\emptyset,\emptyset,\emptyset,[\emptyset])$ | $E_{1-6}$ | |
| $t_{10}$ | $(\emptyset,\emptyset,\emptyset,[\emptyset])$ | $(\emptyset,\emptyset,\emptyset,[\emptyset]) \rightarrow (0,0,0,[0])$ | | $E_{2-6}$ |
| $t_{11}$ | $(\emptyset,\emptyset,\emptyset,[\emptyset]) \rightarrow (0,0,0,[0])$ | $(\emptyset,\emptyset,\emptyset,[\emptyset])$ | $E_{1-7}$ | |
| $t_{12}$ | $(\emptyset,\emptyset,\emptyset,[\emptyset]) \rightarrow (0,0,0,[0])$ | $(\emptyset,\emptyset,\emptyset,[\emptyset]) \rightarrow (0,0,0,[0])$ | $E_{1-8}$ $R_{1-3}$ | $E_{2-7}$ $R_{1-3}$ |

FIG. 7

COOPERATIVE AIRCRAFT NAVIGATION

BACKGROUND OF THE INVENTION

In recent years, unmanned aircraft systems ("UAS") (a.k.a. "unmanned aerial vehicles," "UAVs," "drones," etc.) have become widely used in a wide array of military and civilian applications.

UAS technologies have also continued to develop. One difficulty that has been encountered is navigation of fixed-wing UASs in environments where absolute location information (e.g., GPS) is unavailable, partially unavailable, or degraded. What is needed is an improved system and method for navigation of fixed-wing UASs in a GPS-denied GPS degraded environment.

BRIEF SUMMARY OF THE INVENTION

A UAS may use a front-end nodule to estimate relative pose change, and may periodically publish the relative pose change to a back-end module for use in generating, modifying, updating, and optimizing a global pose model. In one embodiment, the front-end relative pose model may be an extended Kalman filter that may be iteratively updated based on ground features identified and tracked by the front end. Based on a reset criteria (e.g. time, accumulated covariance, etc.), the front end may periodically determine to reset by publishing the relative pose model's delta pose and associated covariance to the back end for incorporation into the global pose model as a pose graph edge, and additionally zeroing out its delta pose and covariance.

Two UASs may share range information to improve back-end pose graph optimization. A first UAS may obtain a range measurement to a second UAS, may share the range measurement with the second UAS, and both UASs may then perform a coordinated reset as described above. As part of the coordinated reset, and in in addition to adding a delta-pose edge to the respective global odometry pose graphs, each UAS may add an edge and node to incorporate the range measurement as a constraint. In one embodiment, each UAS may add at least as much of the other UAS's pose graph is may be necessary to provide an global anchor/linking point. Sharing range information may improve pose graph optimization and associated global pose estimates.

BRIEF DESCRIPTION OF THE DRAWINGS

FIG. 7 shows the front-end delta poses (and covariances) for two UASs, as well as the edges generated by each UAS.

DETAILED DESCRIPTION OF THE INVENTION

This Application claims priority to U.S. Provisional. Application No. 63/008,462, filed on Apr. 10, 2020, the first inventor of which is Gary Ellingson, and which is titled "Cooperative Relative Navigation of Multiple Aircraft in GPS-Denied/Degraded Environment."

An improved system and method for navigation of fixed-wing UASs GPS-denied or GPS-degraded environments is disclosed.

Table of Reference Numbers from Drawings:

The following table is for convenience only, and should not be construed to supersede any potentially inconsistent disclosure herein.

| Reference Number | Description |
| --- | --- |
| 100 | UAS (unmanned aircraft system) |
| 110 | Block diagram of exemplary navigation system |
| 120 | front end |
| 122 | VIO module |
| 124 | Relative control module |
| 130 | Sensor module |
| 202 | Camera frame column |
| 204 | EKF column |
| 206 | Pose graph column |
| 220a-n | Identified features |
| 230 | Row for t = 0.0 s |
| 231 | Row for t = 1.0 s |
| 232 | Row tor t = 2.0 s |
| 233 | Row for t = 3.0 s |
| 234 | Row for t = 4.0 s |
| 235 | Row for t = 5.0 s |
| 236 | Row for t = 6.0 s |
| 237 | Row for t = 7.0 s |
| 238 | Row for t = 8.0 s |
| 239 | Row tor t = 9.0 s |
| 240 | Row for t = 10.0 s |
| 241 | Row for t = 11.0 s |
| 242 | Row for t = 12.0 s |
| 243 | Row for t = 13.0 s |
| 244 | Row for t = 14.0 s |
| 305 | UAS $U_1$ |
| 306 | Flight path of $U_1$ |
| 307 | Flight path of $U_2$ |
| 310 | UAS $U_2$ |
| 311 | Pose graph origin node for $U_1$ |
| 312 | Pose graph origin node for $U_2$ |
| 321 | $t_1$ |
| 322 | $t_2$ |
| 323 | $t_3$ |
| 324 | $t_4$ |
| 325 | $t_5$ |
| 326 | $t_6$ |
| 327 | $t_7$ |
| 328 | $t_8$ |
| 329 | $t_9$ |

-continued

| Reference Number | Description |
| --- | --- |
| 330 | $t_{10}$ |
| 331 | $t_{11}$ |
| 332 | $t_{12}$ |
| 340 | Measured Distance from $U_1$ to $U_2$ at $t_4$ |
| 341 | measured distance from $U_1$ to $U_2$ at $t_7$ |
| 342 | measured distance from $U_1$ to $U_2$ at $t_9$ |
| 400 | Combined pose graph |
| 411a | Range edge |
| 411b | Range edge |
| 412a | Range edge |
| 412b | Range edge |
| 413a | Range edge |
| 413b | Range edge |
| 420 | $U_1$ pose graph at $t_1$ |
| 421 | $U_1$ pose graph at $t_4$ |
| 422 | $U_1$ pose graph at $t_6$ |
| 423 | $U_1$ pose graph at $t_7$ |
| 424 | $U_1$ pose graph at $t_{11}$ |
| 425 | $U_1$ pose graph at $t_{12}$ |
| 430 | $U_2$ pose graph at $t_3$ |
| 431 | $U_2$ pose graph at $t_4$ |
| 432 | $U_2$ pose graph at $t_7$ |
| 433 | $U_2$ pose graph at $t_{10}$ |
| 434 | $U_2$ pose graph at $t_{12}$ |
| 800 | Pose graph without scale bias correction |
| 810a-e | Edges from pose graph |
| 820a-d | Global pose nodes from pose graph |
| 830 | GPS measurement associated with Node n-2 |
| 831 | GPS measurement associated with Node n |
| 850 | Pose graph with scale bias correction |
| 860a-d | Trinary scale bias factors |
| 870a-d | Binary factor R |

Relative Navigation

Figure 1:
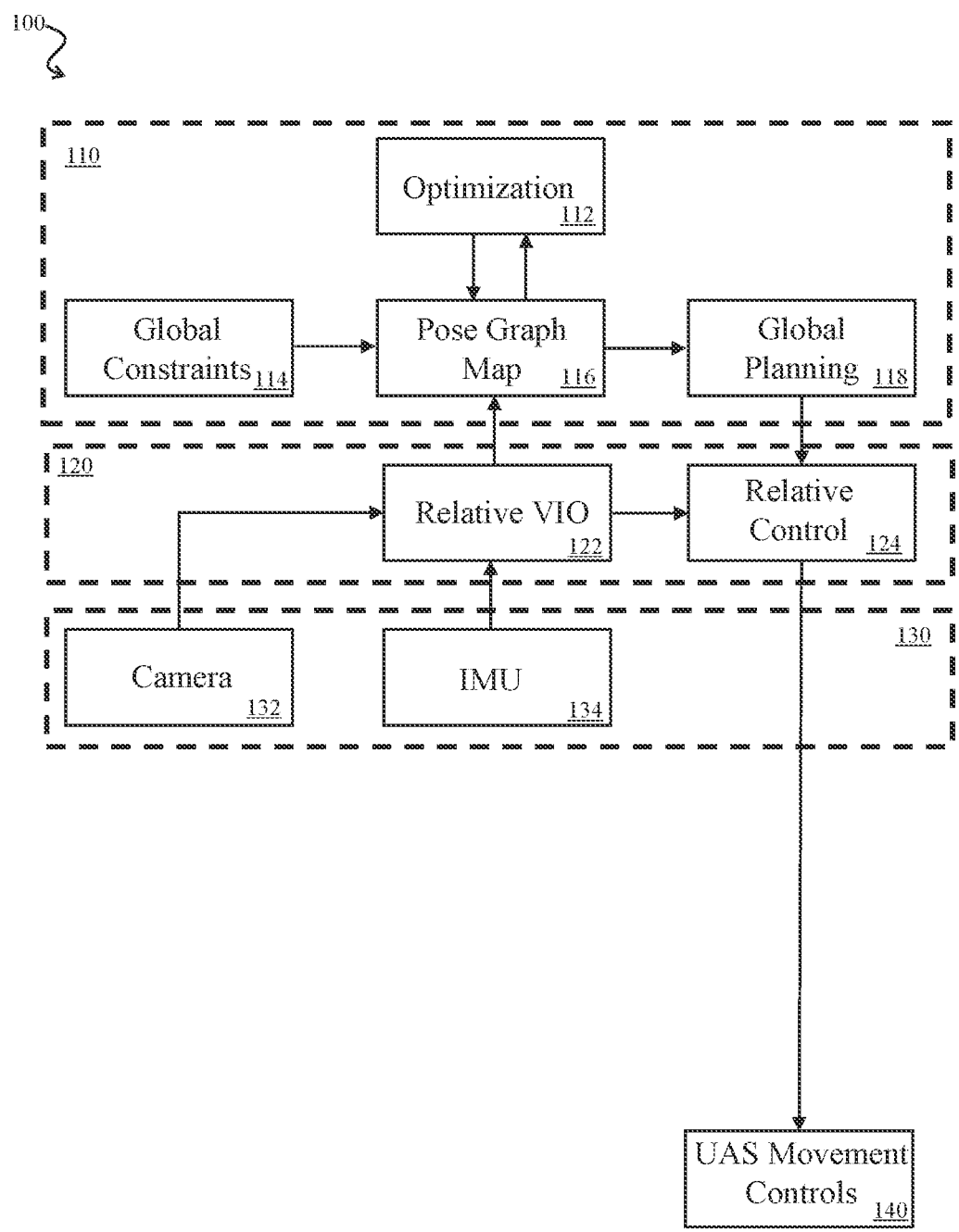
FIG. 1 shows a conceptual view of an exemplary UAS as described herein.

FIG. 1 shows a conceptual view of an exemplary UAS 100, which may include "back end" 110, "front end" 120, sensor module 130, and control module 140. "Back end," "front end," and "sensor module" do not refer to any spatial organization, but instead refer to a conceptual division of components, responsibilities, behaviors, computational resources, and computing efforts as described herein below. Back-end system 110 may comprise optimization module 112, global-constraint module 114, pose-graph map 116, and global planning module 118. Front-end system 120 may comprise visual inertial module 122 and control module 124. Sensors 130 may comprise camera 132 and ITU 134.

Sensor module 130 may comprise a camera 132 and inertial measurement unit ("IMU") 134. IMUs for aircraft are known in the art. IMU 134 may comprise several inertial measurement sensors, e.g., accelerometers and/or rate gyroscopes. Camera 132 may supplement IMU 134 by measuring motion of UAS 100 relative to UAS 100's surroundings usually features on the ground. Even using IMU 134 in conjunction with camera 132, global position and yaw angle are unobservable, and UAS 100's estimate of global position will therefore eventually diverge from its actual global position.

Relative navigation is an approach that uses a combination of local estimation and global estimation. Local estimation may be referred to as "front-end," and global estimation may be referred to as "back-end." For example, an exemplary relative navigation scheme may comprise an extended Kalman filter ("EKF") for front-end estimation relative to the local environment and a back-end optimization that incorporates the relative front-end information to estimate global position/variables.

The front-end system estimates changes in position and attitude with respect to a local frame where the states can remain observable and the Gaussian distribution can accurately represent uncertainty, thus enabling the computational advantage of an EKF to be utilized. The back-end system uses a pose graph (or other modeling paradigm known in the art, e.g., nonlinear unconstrained optimization problem) that can accurately represent nonlinearities in position and heading and can be robustly optimized when given additional constraints. The front-end system may be EKF, MSCKF (as described herein below), or any batch or similar system that delivers estimates of pose change and associated uncertainty to a back end. By pre-marginalizing data gathered in the front end (which could be quite significant for captured images and other captures sensor data), the front-end data is packaged as a small (amount of data) estimate of pose change and covariance, which is then more easily shared (because of the modest bandwidth requirements) to various components, modules, or across networks.

Extended Kalman filters are well-known the art for navigation of robots and other autonomous or partially autonomous vehicles.

FIG. 1 shows a conceptual block diagram of an exemplary UAS 100, its back-end system 110, front-end system 120, sensors 130, and control system 140. Back-end system 110 may comprise optimization module 102, global-constraint module 114, pose-graph map 116, and global planning module 118. Front-end system 120 may comprise visual-inertial-odometry module 122 and relative control module 124. Sensors 130 may comprise camera 132 and IMU 134. Camera In one embodiment, camera 132 may be a monocular camera that provides no direct information about the distance to observed features. Many cameras are known in the art and may be capable of taking and provide a visual image capture as described herein below. Non-visual cameras could also be used. For example, a thermal (infrared IR)) or depth (e.g., lidar) imager could be used. In general, it may be possible to use ally camera that is able to detect static features in consecutive images.

Relative Navigation

The relative pose (i.e., change in x position, change in y position, and yaw angle) of a UAS may be updated using an extended Kalman filter ("EKF") approach. This approach is known in the art. E.g., Thrun S, Burgard W, and Fox D, *Probabilistic robotics*. MIT Press, 2005; Leishman R C, Macdonald J C, Beard R W, and McLain T W "Quadrotors and Accelerometers: State Estimation with an Improved Dynamic Model," *IEEE Control Systems*, vol 34, no. 1, 2014, pp. 28-41; Beard R W and McLain T W, *Small Unmanned Aircraft: Theory and Practice*. Princeton University Press, 2012. MSCKF is one example of such a system/approach. A. I. Mourikis and S. I. Rourneliotis, A Multi-State Constraint Kalman Filter for Vision-aided Inertial Navigation, Proceedings 2007 IEEE International Conference on Robotics and Automation, 2007, pp. 3565-3572.

In one embodiment, the EKF may be a Multi-State Constraint Kalman Filter ("MSCKF"), which is a visual-intertial navigation approach that blends traditional filtering with a batch-like optimization. In MSCKF, the Kalman filter tracks visual features as they move through the camera's field of view, adding as states the vehicle or camera pose when each image is taken. MSCKF and then uses the time history of images to the saline feature to improve estimates of the vehicle's current pose. As each feature is lost from view, all prior observations and vehicle/camera pose estimates at that time are used in a least-squares fashion to solve for an estimated feature position. Then, based on the estimated feature position and the estimated poses, the expected camera measurements to the feature at each of the prior poses is calculated and the differences between expected and actual image measurements to the feature are then used in a specialized Kalman update (one that uses a null space approach to avoid double counting information) to improve current state estimates. If the past state/camera poses no longer have active features remaining, features still in the current field of view, those poses are then removed from the state vector. The Filter continues to propagate state estimates, add new features, track the other features, add pose states to the filter each time a new image is taken, and update filter states whenever another feature exits the field of view. In this way the MSCKF significantly bounds the error growth in the filter's position and attitude.

VIO Motion Estimation

Using camera 132 and IMU 134, navigation system 110 may use a visual-intertial-odometry ("VIO") approach to estimate motion of UAS 100. A VIO approach is well known in the art and is described in detail in many sources. E.g., M. Li, A. Mourikis, High-precision consistent EKF-based visual-inertial odometry, *The International Journal of Robotics Research*, vol. 32, no. 6, 2013, pp. 690-711; Forster C. Zhang Z, Gassner M, Werlberger M, and Scaramuzza D, SVO:Semidirect Visual Odometry for Monocular and Multicamera Systems, *IEEE Transactions on Robotics*, vol. 33, no. 2, 2017, pp. 249-265. In a VIO, camera 132 is pointed toward the ground at an angle that is fixed relative to UAS 100 and IMU 134. Using image processing and pattern recognition techniques that are well known in the art, Relative VIO module 122 may receive image data from camera 132 and may process the received image data to identity features on the ground. E.g., Carlo Tomasi and Takeo Kanade. Detection and Tracking of Point Features. Carnegie Mellon University Technical Report CMU-CS-91-132, April 1991; Jianbo Shi and Carlo Tomasi. Good Features to Track. *IEEE Conference on Computer Vision and Pattern Recognition*, pages 593-600, 1994. Image data received from camera 132 may comprise a time-sequence set of images frames, wherein one frame comprises the visual data captured by camera 132 at a specific time, i.e., an image snapshot. Once a feature on the ground has been identified, relative VIO module 122 may track that feature in subsequently received image frames. By tracking the pixel position (position within the frame capture) of one or more features over subsequent image capture frames, and by combining the change in pixel position with IMU data (e.g., accelerations, angular rates), relative VIO module 122 may be able to estimate relative movement over a time period.

As described herein below, some image capture frames may be characterized as "keyframes." When a feature is identified in a keyframe, and its location within and relative to that keyframe has been determined, the feature's position within subsequent image frames leading up to a subsequent keyframe may be used, in conjunction with other inputs, to estimate the UAS's relative pose change (change in x position, change in y position in yaw angle) from the first keyframe to the second keyframe.

A given feature is tracked across a sequence of images and, once it leaves the camera field of view, the feature track is residualized as a single measurement-update step.

For example, by tracking the frame-position of nine ground features over a 3.0 second period (in one embodiment a camera may capture 30 frames/images per second), and based on acceleration, pitch, and roll data from IMU 134 over the same period, relative VIO module 122 may determine that UAS 100 has moved, during the 3.0 second period, to a location that is 150.0 feet to the north and 30.0 feet to the east of UAS 100's location at the beginning of the 3.0 second period, and that, at the end of the 3.0 second period, UAS 100 is moving in a direction described as 45 degrees to the east of direct north.

Relative VIO module 122 may make this determination using an extended Kalman filter ("EKF"). E.g., Thrun Burgard W, and Fox D, *Probabilistic Robotics*. MIT Press, 2005. EKFs utilize a linear Gaussian representation of the state belief to take advantage of the computational convenience of a Kalman update but maintain the nonlinearity of the process propagation. This combination of properties performs well when errors remain small, such as when the availability of GPS measurements is used to regularly remove drift errors, or when the EKF is periodically reset. The nonlinear nature of the process, however, causes the Gaussian representation of the belief to become inconsistent when errors are large due to estimates drifting from the true value.

Relative Reset Step

Because of this drift phenomenon for EKFs, it may be necessary to periodically reset an EKF. Otherwise sensor errors will accumulate, thereby excacerbating drift. Resetting the EKF and thereby adding a new edge and node to the back-end pose graph—where the new edge includes delta pose and associated uncertainty (often represented by a covariance matrix)—allows for avoiding excessive EKF drift and also allows for adding constraint information (in the form of an edge) to the back-end pose graph.

At a reset, as UAS 100 travels from the current origin, the front-end EKF resets the EKF origin by setting the EKF origin (change in x position, change in y position, change in yaw, covariance) to zeros, where the reset coincides with the declaration of a keyframe image. The front-end states then continue to evolve with respect to the newly-declared reference frame. The state from just prior to the reset then forms a transformation from one reset to the next and, together with the associated covariance, is provided to the back end. The transformations form a directed pose graph, where each reset origin is a node (or node frame) and each transformation is an edge. Because the EKF operates only with respect to a local origin, it is observable, as well as consistent, by construction. The uncertainty is regularly removed from the filter while a Gaussian is still able to accurately represent it, and no linearities are handled appropriately in the back-end graph.

Many different criteria may be used for determining when to perform a reset step, e.g., change in position, change in yaw angle, time since previous reset, accumulated uncertainty, time since previous global constraint input, a combination of these, or any other useful criteria. In one embodiment, the determination of when to do a reset may depend on the number of features in the current frame that are persistent since the most recent keyframe. For example, when a threshold number of features identified in the most recent keyframe are no longer identified in the current frame, then front-end 120 may determine to do a reset step and mark the current frame as a keyframe. In one embodiment, the threshold number may be nine, and front-end 120 may be configured to perform a reset step when the number of common features in the current frame are common with the number of features in the most recent keyframe drops below nine.

The following table provides an example of the frames at which an example front-end 120 may declare a key frame and perform a reset step. The captured frame $F_n$ at time n may be a keyframe at which front-end 120 may perform a reset step. Front-end 120 may identify 11 features ($f_1$, $f_2$, $f_3$, $f_4$, $f_5$, $f_6$, $f_7$, $f_8$, $f_9$, $f_{10}$, $f_{11}$) in $F_n$. At time n+1, front-end 120 may identify the same 11 features in $F_{n+1}$ as in $F_n$. In $F_{n+2}$, front-end 120 may identify new feature $f_{12}$. At time n+2, front-end is still tracking 11 features that were identified in keyframe $F_n$.

At time n+3, front-end 120 is no longer able to identify $f_6$, and is therefore tracking only 10 features that were also identified in keyframe $F_n$. In $F_{n+4}$, front-end 120 may identify new feature $f_{13}$. At times n+5 and n+6, front-end 120 may identify the same features as at time n+4. At time n+7, front-end 120 is no longer able to identify $f_9$, and is therefore tracking only nine features that were also identified in keyframe $F_n$. At times n+8 and n+9, front-end 120 may identify the same features as at time n+7. At time n+10, front-end 120 may identify new feature $f_{14}$ in $F_{n+10}$. At time n+11, front-end 120 may identify the same features as at time n+10. At time n+12, front-end 120 is no longer able to identify $f_2$, and is therefore tracking only eight features that were also identified in keyframe $F_n$. Because the number of features in common with the most recent keyframe $F_n$ has dropped below the threshold of nine, front-end 120 declares $F_{n+12}$ as a keyframe and performs a reset step. At times n+13 and n+14, front-end 120 may identify the same features as at time n+12. At both n+13 and n+14, frames $F_{n+13}$ and $F_{n+14}$ each share 11 features in common with the most recent keyframe $F_{n+12}$. At time n+15, front-end 120 may identify new feature $f_{15}$ in $F_{n+15}$.

small UAS over relatively flat farmland, it was determined that a common feature threshold of nine produced acceptable results without overtaxing available resources.

In one embodiment, the common feature threshold may be a percentage of the nominal number of good features in the image, e.g., 20 percent. With this approach, a new keyframe would be declared when the common feature overlap between keyframe image and a subsequent image dropped below $\frac{1}{5}^{th}$ of the features in the keyframe image.

Many different approaches, heuristics, and/or criteria may be used to determine when to perform a reset. The overarching principle is to resets with sufficient frequency so that the change in pose is fairly accurate and the covariance is representative. Designing a reset function/criteria, for a specific application may require some domain-specific information, experimentation, and tuning.

The back-end accounts for and is responsible for the global pose estimate. The back-end calculates global pose estimates by using the keyframe-to-keyframe transformations as edges in a pose graph or analogous data structure or model. The global pose, which is necessary for accomplishing a mission with a global goal, can be produced by combining, or composing, the transforms. This process may be referred to pose graph optimization.

The back-end may be able to opportunistically improve optimization of the pose graph by incorporating constraints

| Time | Key Frame? | Identified Features | Changes from Previous Frame |
|---|---|---|---|
| n | Yes | $f_1, f_2, f_3, f_4, f_5, f_6, f_7, f_8, f_9, f_{10}, f_{11}$ | — |
| n + 1 | | $f_1, f_2, f_3, f_4, f_5, f_6, f_7, f_8, f_9, f_{10}, f_{11}$ | — |
| n + 2 | | $f_1, f_2, f_3, f_4, f_5, f_6, f_7, f_8, f_9, f_{10}, f_{11}, f_{12}$ | added $f_{12}$ |
| n + 3 | | $f_1, f_2, f_3, f_4, f_5, f_7, f_8, f_9, f_{10}, f_{11}, f_{12}$ | lost $f_6$ |
| n + 4 | | $f_1, f_2, f_3, f_4, f_5, f_7, f_8, f_9, f_{10}, f_{11}, f_{12}, f_{13}$ | added $f_{13}$ |
| n + 5 | | $f_1, f_2, f_3, f_4, f_5, f_7, f_8, f_9, f_{10}, f_{11}, f_{12}, f_{13}$ | — |
| n + 6 | | $f_1, f_2, f_3, f_4, f_5, f_7, f_8, f_9, f_{10}, f_{11}, f_{12}, f_{13}$ | — |
| n + 7 | | $f_1, f_2, f_3, f_4, f_5, f_7, f_8, f_{10}, f_{11}, f_{12}, f_{13}$ | lost $f_9$ |
| n + 8 | | $f_1, f_2, f_3, f_4, f_5, f_7, f_8, f_{10}, f_{11}, f_{12}, f_{13}$ | — |
| n + 9 | | $f_1, f_2, f_3, f_4, f_5, f_7, f_8, f_{10}, f_{11}, f_{12}, f_{13}$ | — |
| n + 10 | | $f_1, f_2, f_3, f_4, f_5, f_7, f_8, f_{10}, f_{11}, f_{12}, f_{13}, f_{14}$ | added $f_{14}$ |
| n + 11 | | $f_1, f_2, f_3, f_4, f_5, f_7, f_8, f_{10}, f_{11}, f_{12}, f_{13}, f_{14}$ | — |
| n + 12 | Yes | $f_1, f_3, f_4, f_5, f_7, f_8, f_{10}, f_{11}, f_{12}, f_{13}, f_{14}$ | lost $f_2$ |
| n + 13 | | $f_1, f_3, f_4, f_5, f_7, f_8, f_{10}, f_{11}, f_{12}, f_{13}, f_{14}$ | — |
| n + 14 | | $f_1, f_3, f_4, f_5, f_7, f_8, f_{10}, f_{11}, f_{12}, f_{13}, f_{14}$ | — |
| n + 15 | | $f_1, f_3, f_4, f_5, f_7, f_8, f_{10}, f_{11}, f_{12}, f_{13}, f_{14}, f_{15}$ | added $f_{15}$ |

In this approach, the common feature threshold is the number of common features that must be maintained since the most recent keyframe. When the number of common features since the most recent keyframe is less than the common feature threshold, a reset occurs and a new keyframe is declared. The common feature threshold depends on multiple factors, and is often sensitive to a specific application or environment. In general, the system and method disclosed herein may perform best when the common feature threshold is at least 3 to 5 features because of the ability to determine relative changes in direction and to overcome error from other features. In general, performance improves as the common feature threshold is increased, but requires computational resources may also increase. On the other hand, using a common feature threshold that is too low may result in a reset frequency that overtaxes available resources.

Determining a good common feature threshold may require trial and error, tuning, and/or problem domain knowledge (e.g., distinctness and identifiability of features, ground topography, etc.). In one embodiment for flying a such as opportunistic FPS measurements and/or place-recognition loop closures. Using these techniques, relative navigation deliberately avoids global updates to the rout-end filter and thereby increases EKF robustness.

The division of the front end and back end also provides additional benefits for scalable UAS operations. First, because the front-end EKF may implicitly draw on the Markov assumption (i.e., the current state and covariance completely represent the previous sequence of events and measurements), it essentially compresses the high-rate sensor information into edges that are published at a low frequency. This compression, effectively pre-marginalization of the graph factors, helms to make the back-end scale for long-duration flights. Also, as the back-end graph grows and the computation of optimize non increases, the decoupling of the front end allows the graph optimization to be completed slower than real-time if needed, while the front end is still providing full-rate state estimates necessary for vehicle control.

Publishing Relative Motion Estimates to Back End

Relative VIO module 122 may periodically send estimates of relative pose change (and associated covariance)

relative movement information to back-end module 110. Such estimates of relative pose change may be referred to as "delta pose." Back-end module 110 may use this received delta pose (with associated covariance) model and estimate UAS 100's global path and pose. As used herein, "global" may refer to a measurement relative to a fixed point on the ground, e.g., a starting point. In one embodiment, and as is well-known in the art, back-end module 110 may use a pose graph to model and estimate global path and pose. Back-end module 110 may use relative delta pose information (and associated covariance) from front-end 120 to generate and/ or update edges in a pose graph.

In the exemplary embodiment described herein below, nodes in a pose graph are global pose estimates. Each global-pose-estimate node is associated with a pose graph edge, where the edge comprises a delta pose and associated covariance published from the front end to the back end in conjunction with a front-end reset and designation of a keyframe.

Publishing odometry estimates, which may be referred to as a change in pose or "delta pose," along with a corresponding covariance matrix (or the diagonal from a covariance matrix) allows for back-end pose graph optimization (for estimating global pose) using a very small amount of data that is orders of magnitude smaller than the data being collected in the VIO module.

Figure 2A:
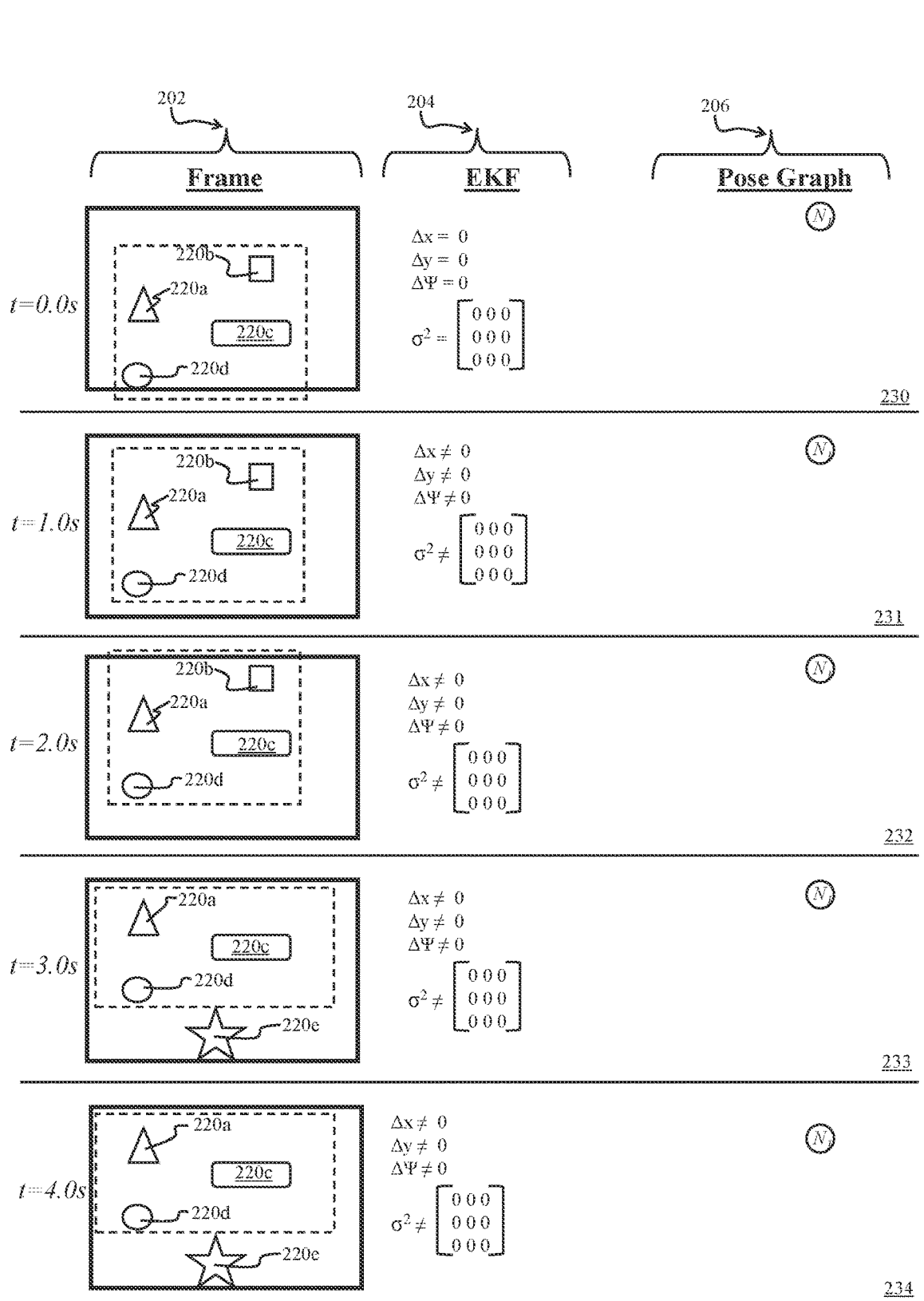
FIG. 2a shows several time points for front-end feature tracking and resetting.
Figure 2B:
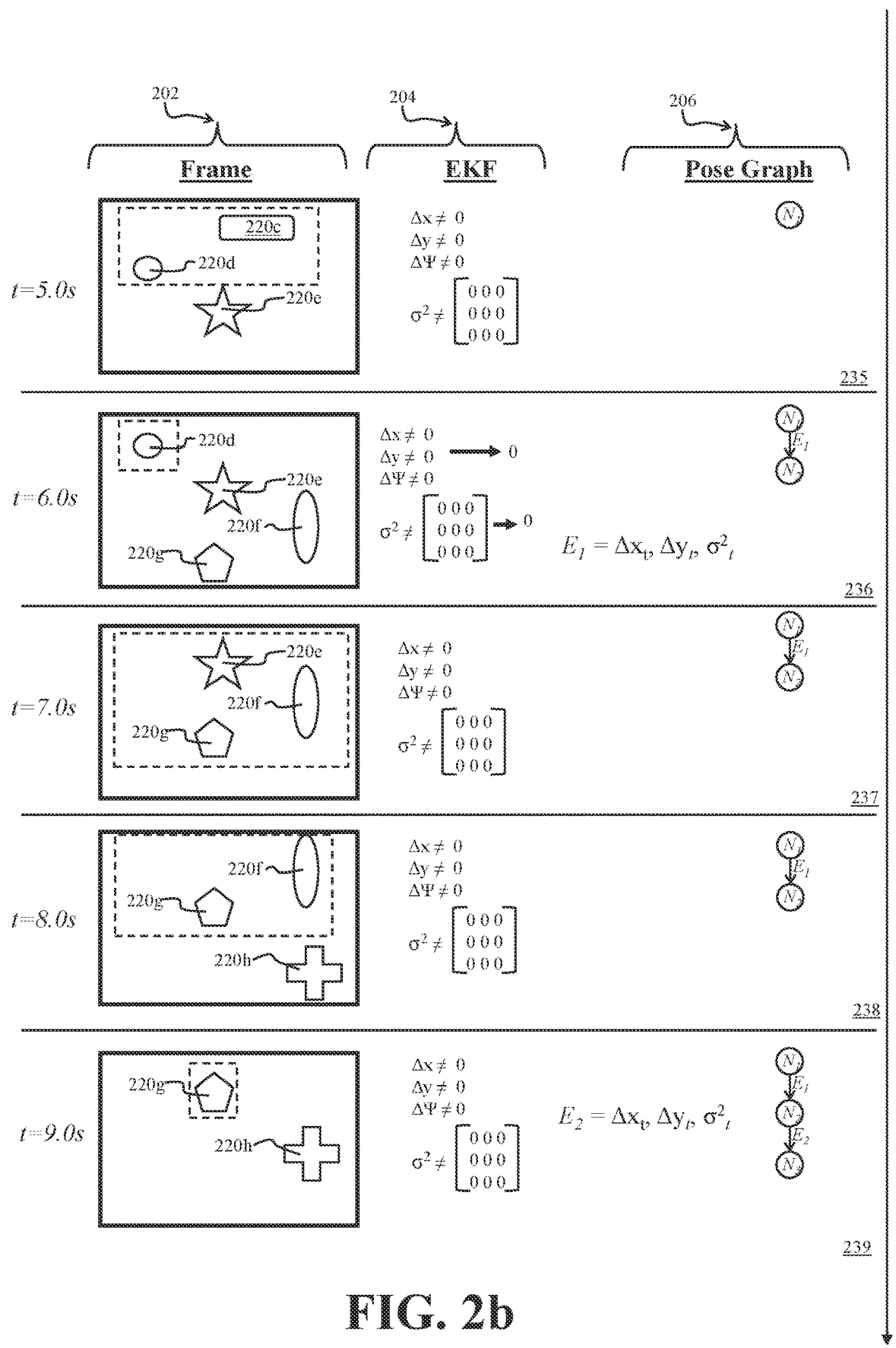
FIG. 2b shows several time points for front-end feature tracking and resetting.
Figure 2C:
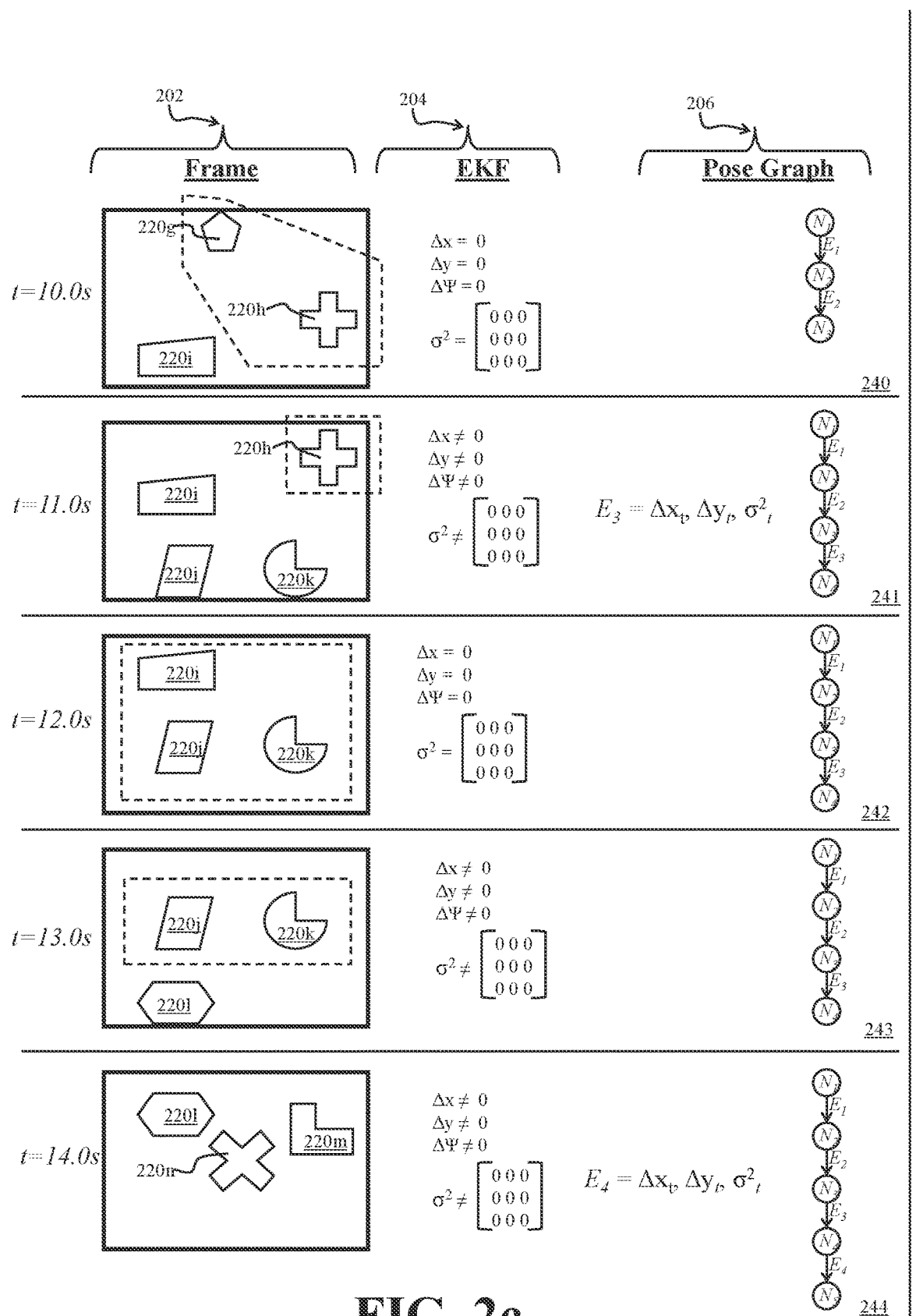
FIG. 2c shows several time points for front-end feature tracking and resetting.

FIGS. 2a-2c provide an example of an exemplary system and method for implementing a relative reset step for UAS navigation. FIGS. 2a-2c show frame features, front-end relative EKF values for delta pose and covariance, and the associated back-end pose graph. FIGS. 2a-c are organized as three running columns: camera frame column 202, EKF column 204, and pose graph column 206. Each row 230-44 in FIGS. 2a-c is a different time point at which the camera capture Frame (with identified features) is shown in column 202, the EKF values are shown in column 204, and the pose graph is shown in column 206.

In the example shown in FIGS. 2a-c, for the sake of simplicity, the criteria for declaring a keyframe and performing a reset is a common feature threshold of 2. As described herein above a common feature threshold of 2 is likely too tow, but is used here for the sake of simplicity in demonstrating the system and process.

At t=0.0 s in row 230, front end 120 has identified four visual features: 220a, 220b, 220c, and 220d. Because the flight/path has just begin, the EKF values are 0 s and the only node in the pose graph is the origin node $N_f$.

At t=1.0 s (row 231), front end 120 has identified the same four features (220a, 220b, 220c, and 220d) identified in the previous capture. Because the number of common features with the most recent keyframe) is not less than the threshold (2), front end 120 does not do a reset. The EKF values are non-zero because image processing of the features in the frame captures shows movement.

At t=2.0 s (row 232), front end 120 has identified the same four features (220a, 220b, 220c, and 220d) identified in the previous capture. Because the number of common features with the most recent keyframe) is not less than the threshold (2), front end 120 does not do a reset. The EKF values are non-zero because image processing of the features in the frame captures shows movement.

At t=3.0 s (row 233), front end 120 has identified the three of the four features (220a, 220c, and 22d) identified in the most recent keyframe (t=0.0 s). Because the number of common features (with the most recent keyframe) is not less than the threshold (2), front end 120 does not do a reset. The EKF values are non zero because image processing of the features in the frame captures shows movement.

At t=4.0 s (row 234), front end 120 has identified three of the four features (220a, 220c, and 22d) identified in the most recent keyframe (t=0.0 s). Because the number of common features (with the most recent keyframe) is not less than the threshold (2), front end 120 does not do a reset. The EKF values are non-zero because image processing of the features in the frame captures shows movement.

Continuing to FIG. 2b, at t=5.0 s (row 235), front end 120 has identified two of the four features (220c, 22d) identified in the most recent keyframe (t=0.0 s). Because the number of common features (with the most recent keyframe) is not less than the threshold (2), front end 120 does not do a reset. The EKF values are non-zero because image processing of the features in the frame captures shows movement.

At t=6.0 s (row 236), front end 120 has identified only one of the four features (220d) in the most recent keyframe (t=0.0 s). Because the number of common features (with the most recent keyframe) is now less than the threshold (2), front end 120 designates a keyframe, publishes edge $E_1$ to the pose graph, and resets the EKF.

At t=7.0 s (row 237), front end 120 has identified three of the four features (220e, 220f, 220g) identified in the most recent keyframe (t=6.0 s). Because the number of common features (with the most recent keyframe) is not less than the threshold (2), front end 120 does not do a reset. The EKF values are non-zero because image processing of the features in the frame captures shows movement.

At t=8.0 s (row 238), front end 120 has identified two of the four features (220f, 220g) identified in the most recent keyframe (t=6.0 s). Because the number of common features (with the most recent keyframe) is not less than the threshold (2), front end 120 does not do a reset. The EKF values are non-zero because image processing of the features in the frame captures shows movement.

t=9.0 s (row 239), front end 120 has identified only one of the four features (220g) in the most recent keyframe (t=7.0 s). Because the number of common features with the most recent keyframe) is now less than the threshold (2), front end 120 designates a keyframe, publishes edge 132 to the pose graph, and resets the EKF.

At t=10.0 s (row 240), front end 120 has identified both features (220g, 220h) identified in the most recent keyframe (t=9.0 s). Because the number of common features (with the most recent keyframe) is not less than the threshold (2), front end 120 does not do a reset. The EKF values are non-zero because image processing of the features in the frame captures shows movement.

At t=11.0 s (row 241), front end 120 has identified only one of the four features (220h) in the most recent keyframe (t=9.0 s). Because the number of common features (with the most recent keyframe) is now less than the threshold (2), front end 120 designates a keyframe, publishes edge $E_3$ to the pose graph, and resets the EKF.

At t=12.0 s (row 242), front end 120 has identified three of the features (220i, 220j, 220k) identified in the most recent keyframe (t=11.0 s). Because the number of common features (with the most recent keyframe) is not less than the threshold (2), front end 120 does not do a reset. The EKF values are non-zero because image processing of the features in the frame captures shows movement.

At t=13.0 s (row 243), front end 120 has identified two of the features (220j, 220k) identified in the most recent keyframe (t=11.0 s). Because the number of common features (with the most recent keyframe) is not less than the threshold (2), front end 120 does not do a reset. The EKF values are non-zero because image processing of the features in the frame captures shows movement.

t=14.0 s (row 244), front end 120 has identified none features in the most recent keyframe (t=11.0 s). Because the number of common features (with the most recent keyframe) is now less than the threshold (2), front end 120 declares a keyframe, publishes edge $E_4$ to the pose graph, and resets the EKF.

Figure 9:
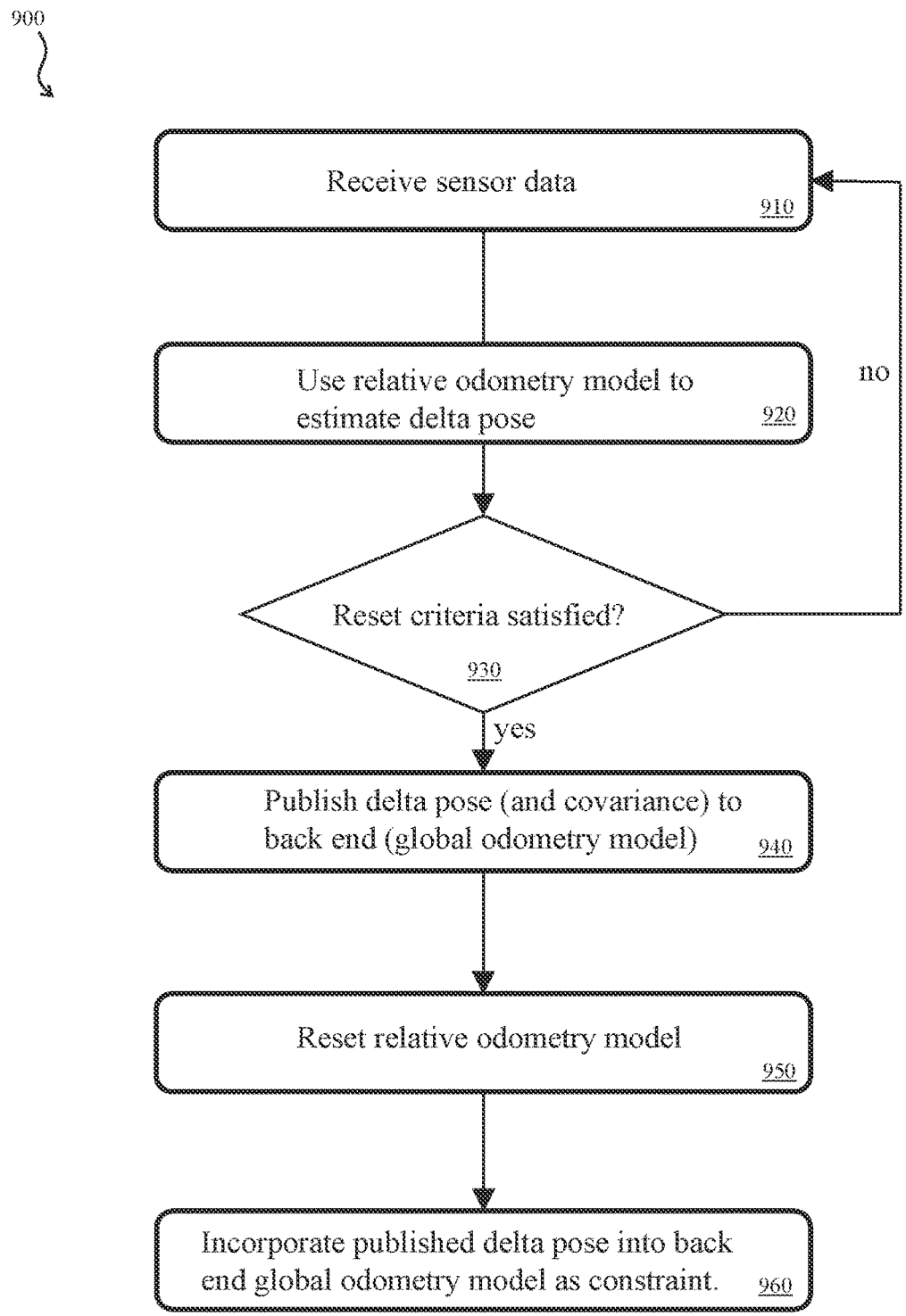
FIG. 9 shows a flow chart for an exemplary embodiment of performing a relative reset.

FIG. 9 is a flowchart showing an exemplary embodiment of a method for performing a relative reset as described herein. At step 910, a front end may receive sensor data. At step 920, the front end may use a Kalman filter to estimate delta pose and develop a covariance model. At step 930, front end may determine, based on the reset criteria, whether to perform a reset. If the reset criteria is not satisfied, then the front end may again receive sensor data at step 910. If the reset criteria is satisfied, then the front end may proceed to step 940 and publish the delta pose and associated covariance to the back end. At step 950, the front end may reset the relative odometry model (e.g., extended Kalman Filter). At step 960, the back end may incorporated the published delta pose and covariance as a pose graph edge.

Opportunististic GPS Measurements

In one embodiment, an opportunistic GPS measurement, or other opportunistic constraints, may be incorporated into a UAS's back-end pose graph as a factor by performing an EKF reset and inserting the GPS or other (global frame) measurement factor into the pose graph connected to the associated global-pose-estimate node or delta-pose edge created in conjunction with the EKF reset, thereby adding an additional constraint to improve pose-graph optimization.

Scale Bias

In one embodiment, for back-end module 110 to more accurately utilize relative movement information from front-end 120, back-end module 110 may use a scale-bias model to account for correction of scale bias errors between edges in a pose graph or other representation of global location. Scale errors may arise from potentially unobservable velocity associated with straight-and-level flight and from the correlation from one graph edge to the next. The bias error may be removed from an edge by scaling the edge's $\Delta_x$ (change x position) and $\Delta_y$ (change in y position) components. Modeling the correlation of of the velocity error between back-end pose graph edges improves the ability of the back-end optimization scheme/algorithm to remove bias error when intermittent global measurements of other loop-closure-lie constraints are available. The bias error for edges in the back-end pose graph may be modeled as a slowly varying random process where the bias in successive edges is not independent. This may be done by adding a cost proportional to the change in scale between successive edges. The scale bias error is removed in the back-end optimization when global measurements are available to remove the bias errors.

Figure 8A:
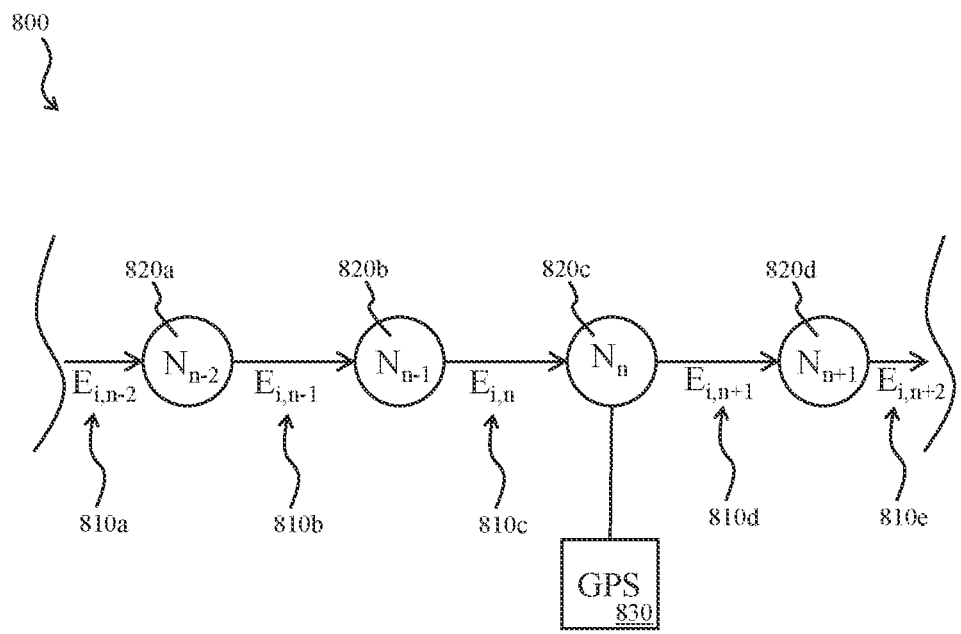
FIG. 8a, shows a segment of a pose graph that does not implement bias scale correction.
Figure 8B:
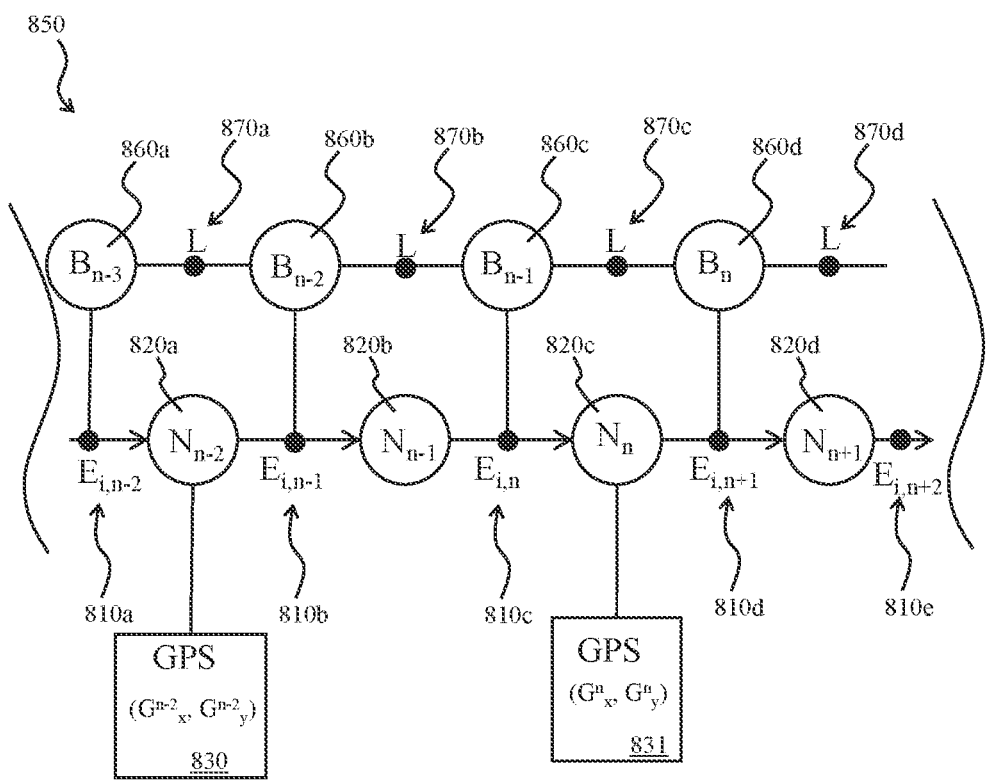
FIG. 8b shows a segment of a pose graph that in bias scale correction.

In essence, this approach spreads out the global pose correction resulting from an intermittent GPS or other global measurement over multiple delta-pose edges, instead of concentrating the correction at or near the delta-pose edges adjacent to or near the graph edge or node to which the GPS or other global measurement is connected in the pose graph. This scale bias correction approach may be implemented numerous ways. In one embodiment, this scale bias correction approach may be implemented by adding trinary bias correction factors for front-end delta-pose edges to the pose graph. FIGS. 8a and 8b show an exemplary implementation.

FIG. 8a shows a section from an exemplary pose graph 800 without scale bias correction. Edges 810a-e are odometry edges (delta pose and associated covariance) created at edge resets. Nodes 820a-d are the global-pose-estimate nodes associated with edges 810a-d respectively. Global constraint 830 may be an intermittent GPS measurement or any other global measurement or constraint.

FIG. 8b shows a section from an exemplary pose graph 850 with scale bias correction. Trinary scale bias factors 860a-d are implemented in pose graph 850 as factors defined by a loss function that adjusts an associated global pose node.

The loss function $\ell$ is defined as:

$$l(N_k, N_{k+1}, B_k m) = \begin{bmatrix} (\cos(\Psi_k)(x_{k+1} - x_k) + \sin(\Psi_k)(y_{k+1} - y_k))b_x - m_x \\ (-\sin(\Psi_k)(x_{k+1} - x_k) + \cos(\Psi_k)(y_{k+1} - y_k))b_y - m_y \\ (\Psi_{k+1} - \Psi_k) - m_\Psi \end{bmatrix}$$

where $x_k$ and $y_k$ are the x and y coordinates, respectively, of the global pose estimate at $N_k$; $x_{k+1}$ and $y_{k+1}$ are the x and y coordinates, respectively, of the global pose estimate at $N_{k+1}$; $b_x$ and $b_y$ are the x and y scale bias (i.e., x and y scaling coefficients, calculated as $b_x=(G^n_x-G^h_x)/(m_x-G^h_x)$ and $b_y=(G^n_y-G^h_y)$, where $G^n_x$ is the x coordinate of a GPS measurement associated with global pose estimate node n, $G^n_y$ is a the y coordinate of a GPS measurement associated with global pose estimate node n, $G^h_x$ is the x coordinate of a GPS measurement associated with global pose estimate node b where b<n, $G^n_y$ is a the y coordinate of a GPS measurement associated with global pose estimate node b where b<n and $m_x$ and $m_y$ are the $\Delta x$ and $\Delta y$ components of $E_k$. This output of the loss function 1 is an updated global pose estimate $N_{k+1}$ that has been corrected to account for scale bias.

Binary factor L (870a-d) is a covariance between respective bias variables (e.g., factor L 870a is a covariance between bias variable $B_{n+3}$ 860a and $B_{n-2}$ 860b). In one embodiment, L may be $0.0001I_{2\times2}$, where I is 2×2 identity matrix. In practice L may be hand-tuned.

Using this approach, scale bias may by distributed across multiple (possibly all) affected delta pose edges (and associated global pose estimates), thereby improving the accuracy of the pose graph's estimated global pose values between intermittent GPS measurements or other global measurements/constraints.

Cooperative Navigation

In one embodiment, a UAS may benefit from sharing (sending and receiving) constraint information with another UAS. Constraint information may refer to any information that may constrain, guide, or direct optimization of the back-end model of the UAS's global pose. As described herein, a pose graph is one model that may be used to store and optimize information about global pose.

Information that may be shared between two UASs includes but is not limited to odometry measurements (e.g., x,y position changes, yaw angle changes) EKF information (e.g., uncertainties, uncertainty matrices, covariance matrices), intervehicle range measurements/information, and any other constraint information In one embodiment, two UASs may share a range measurement (distance between the two UASs) and, in conjunction (i.e., substantially simultaneously) with sharing a range measurement, the UASs may perform a coordinated/simultaneous reset step. Performing a coordinated/simultaneous reset at a first UAS provides a node in the first UAS's back-end pose graph—the new global-pose-estimate node at the end of the newly added delta-pose edge—to which a new binary range edge may be added and connected as a constraint. The binary range edge is the range distance (and variance) to a second UAS at (or substantially near) the time of performing the reset. The new range edge connects the first UAS's new global-pose-estimate node with the second UAS's global-pose-estimate node created by the second UAS in conjunction with measuring the distance between the first and second UASs and simultaneously performing a reset (at both the first UAS and the second UAS).

When each UAS involved in an information-sharing communication/conversation performs a reset by publishing delta-pose (and associated uncertainty information, e.g., a covariance matrix information to its respective back-end, each respective back-end creates a new a delta-pose edge (relative odometry information) and covariance matrix and a new global pose estimate node at the end of the new delta-pose edge, the new node representing a global pose variable.

In one embodiment, a set or swarm of two or more UASs may be involved in a coordinated/simultaneous reset as long as all of the UASs in the set become aware of the range measurements between between all pairs or UASs in the set simultaneously (or sufficiently simultaneously so that any error from non-simultaneity is inconsequential relative to the flight time). In this situation, if, e.g., three UASs perform a coordinated/simultaneous reset, all three UAS's would simultaneously perform a reset by zeroing out their respective front-end EKFs, sending delta-pose (including covariance information) information to their respective back-ends to generate a new delta-pose edge in the pose graph, and adding a new range edge and pose graph node for the range information for each of the other two UASs in the set.

In general, when multiple UASs are using the potential reset criteria described herein above, e.g., change in position, change in yaw angle, time since previous reset, accumulated uncertainty, time since previous global constraint input, and/or number of persistent visual feature tracks, the UASs will likely perform at least some asynchronous resets. UASs may perform synchronous resets when sharing information with each other, e.g., distance between UASs or other information. Such a synchronous reset, e.g., when multiple UASs are sharing information with each other, may be referred to as a "coordinated reset."

Several technologies may enable UASs to generate or obtain inter-UAS range measurements, i.e., the distance from a first UAS to a second UAS. In general, the distance from first UAS to a second UAS may be defined as the distance between a fixed point, e.g., a defined center, on each UAS. These technologies include but are not limited to ranging radios, specialized radios that produce distance measurements using time-of-flight, received-signal-strength-indicator (RSSI), radio-frequency identification (RFID), carrier frequency signals carrying additional information, range measurement to a fixed ground-based range station using a distance-measuring-equipment (DME) transponder, and/or real-time location services (RTLS).

In one embodiment, a first UAS may share some or all of the following information with a second UAS in the same swarm: edge information and range measurement information. As described herein below, edge information may comprise pose change and pose change uncertainty. In general, UAS's may share with each other any information a UAS may have about any other UAS's pose graphs, thereby helping each other to build and maintain, or at least attempt to build and maintain, a complete copy of all pose graphs for an entire swarm.

In one embodiment, to decrease the amount of data communication between one or more UASs, a first UAS's edge uncertainty information that is shared with a second UAS may be represented using only the diagonal elements of the first UAS's covariance matrix from its front-end EKE. Although this simplification is a slight mismodeling of odometry uncertainty, the decreased communication data may be justified because, in general, the off-diagonal cross correlation terms remain small due to relatively frequent resets in the front-end estimator. A UAS may determine to share non-diagonal elements based on, e.g., time between resets or some other metric or heuristic that may justify or necessitate such additional co variance information. Additionally, various constraints or problem domain characteristics may make it beneficial to include some or all non-diagonal elements.

In one embodiment, to implement sharing, each UAS in a UAS swarm or group may be uniquely identified by a UAS-id, which may be an 8-bit character or other identifier as may be known in the art. Because a UAS may add an edge to its pose graph for both delta pose and range measurements, a UAS's pose graph may have at least two different types of edges: delta-pose edges and range measurement edges. To uniquely identify a delta-pose edge or node in a UAS's back-end pose graph, a unique identifier may be assigned to each delta-pose edge, and that unique edge identifier may additionally additional uniquely identify the node to which the delta pose edge points, i.e., the node at the end of (i.e., created in conjunction with) delta-pose edge. In one embodiment, a UAS may use incremental integers to identify delta pose edges in its back-end pose graph, assigning incremental integers to delta-pose edges acid delta-pose nodes as delta-pose edges are added to the pose graph. For example, a first UAS identified as $U_1$, may have back-end pose graph delta-pose edges $E_{1-1}$, $E_{1-2}$, $E_{1-3}$, $E_{1-4}$, $E_{1-5}$, $E_{1-6}$, $E_{1-7}$, and $E_{1-8}$ after $U_1$ has added eight edges to its back-end pose graph, and the next edge added may be identified as $E_{1-9}$.

A delta-pose edge may comprise values for the change in x,y position, change in yaw angle, and a variance/uncertainty element. Change in z positron, i.e., elevation/altitude, may also be used, but may be unnecessary because a UAS may be able to determine absolute a position through use of an altimeter device, many of which are known in the art.

A delta-pose edge may therefore be identified and described by $E_{i-e} := (\Delta, \sigma^2)$, where the subscript i is the UAS's unique identifier; the subscript e is the unique identifier for a delta-pose edge in the back-end pose graph of UAS $U_1$; delta pose $\Delta := (\Delta_x, \Delta_y, \Delta_\psi)$ comprises the change of x position $\Delta_x$, change of y position $\Delta_y$, and change of yaw angle $\Delta_\psi$; and covariance matrix $\sigma^2$ comprises a 3×3 covariance matrix. The dimensions of the covariance matrix are 3×3 because there are three variables: $\Delta_x$, $\Delta_y$, $\Delta_\psi$. In an embodiment in which only the diagonals of the covariance matrix are used, covariance $\sigma^2$ may be described as $\sigma^2 := (\sigma^2_x, \sigma^2_y, \sigma^2_\psi)$ where $\sigma^2_x$ is a variance for $\Delta_x$, $\sigma^2 y$ is a variance for $\Delta_y$, and $\sigma^2_\psi$ is a variance for $\Delta_\psi$.

In some embodiments, a delta-pose edge may additionally include a time stamp t.

To uniquely identify a range edge or node in a UAS's back-end pose graph, a unique identifier may be assigned to each range edge, and that unique range edge identifier nay additionally uniquely identify the global-pose-estimate node and delta-pose edge associated with the range edge. In one embodiment, a UAS may use incremental integers to identify range edges in its back-end pose graph, assigning incremental integers to range edges and range nodes as range edges are added to the pose graph. For example, a first UAS, identified as $U_1$ may have back-end pose graph range edges $R_{1-1}$, $R_{1-2}$, $R_{1-3}$, $R_{1-4}$, $R_{1-5}$, $R_{1-6}$, $R_{1-7}$, and $R_{1-8}$ after $U_1$ has added eight range edges to its back-end pose graph, and the next range edge added may be identified as $R_{1-9}$.

A range edge may comprise a distance to another UAS, identifier for the other UAS, and a variance for the distance. In one embodiment, a range edge may be identified and described by $R_{i-e} := (d, v, j, \sigma^2)$, where the subscript i is the UAS's unique identifier; the subscript e references $E_{i-e}$, which is the delta-pose edge with which $R_{i-e}$ is associated; distance d is the distance from $U_i$ to $U_v$ at the time of the reset resulting in $U_v$'s creation of delta-pose edge $E_{v-j}$; and $\sigma^2$ is the variance for d.

A range measurement may be identified and described as $\Phi_{p,e,q,f} := d$, where d is the distance between $U_p$ and $U_q$ at the time of the coordinated reset giving rise to the creation of $E_{p-e}$ and $E_{qf}$ at UAS $U_p$ and $U_q$, respectively. In some embodiments a range measurement may additionally comprise a time stamp.

Depending on the range technology, determining a range measurement may occur in various ways. Some technologies use a short message exchange/conversation between two UAS, e.g., a first UAS sends a message to a second UAS, which responds to the first UAS and, based on the response from the second UAS, the first UAS is able to determine the distance to the second UAS. The first UAS may then transmit the range to the second UAS. In general, although taking a range measurement and transmitting a range measurement to another UAS do take some time, the time for such actions (milliseconds or less) is orders of magnitude smaller than the magnitude of pose change that may occur during the time required to take a range measurement and/or transmit a range measurement of message to another UAS. Because of this order-of-magnitude disparity, the time necessary to tale a range measurement and/or transmit a message may be inconsequential and may be ignored, thereby allowing for treating such actions as instantaneous relative to back-end pose graph optimization.

A UAS $U_p$ may obtain the distance for a range measurement d to UAS $U_q$ using any one of the methods disclosed herein. In conjunction the distance d to $U_q$, $U_p$ may determine the current edge index (i.e., the highest edge index) for $U_q$, e.g., by sending a message to $U_q$ to request the index of $U_q$'s current edge index. When $U_p$ has obtained the distance d to $U_q$ and has received $U_q$'s current edge index f, then $U_p$ may send a range message $\Phi_{p,e+1,q,f+1}$ to $U_q$. In conjunction with sending $\Phi_{p,e+1,q,f+1}$ to $U_q$, $U_p$ may perform a reset operation by adding an delta pose edge $E_{p-e+1}$ (and associated node) to its back-end pose graph, where $\Delta$ comprises $U_n$'s change in x position, change in y position, and change in yaw angle $\Psi$ since $E_{p-e}$; and $\sigma^2$ is the respective variances for the three components of $\Delta$. Additionally, in conjunction with adding edge $E_{p-e+1}$, $U_p$ may use $\Phi_{p,e+1,q,f+1}$ to add a range edge $R_{p-e+1}$ to its back-end pose graph. This added range edge provides another constraint to improve pose graph optimization. In general, variance $\sigma^2$ in range edge $R_{p-e+1}$ is dependant on the range hardware (and/or other aspects of the range technology) and will be small relative to the range distance d.

Whep $U_q$ receives $\Phi_{p,e+1,q,f+1}$ from $U_p$, $U_q$ will perform a reset operation similar to $U_p$'s reset operation. $U_q$ may add edge $E_{q-f+1}$ (and associated node) to its back-end pose graph, where $\Delta$ comprises $U_q$'s change in x position, change in y position, and change in yaw angle $\Psi$ since $E_{q-f}$; and $\sigma^2$ is the respective variances for the three components of $\Delta$. Additionally, in conjunction with adding edge $E_{q-f+1}$, $U_q$ may use $\Phi_{p,e+1,q,f+1}$ to add a range edge $R_{q-f+1}$ to its back-end for use in optimizing $U_q$'s back-end pose graph.

This description is one potential embodiment for two UASs $U_p$ and $U_q$ to share a range measurement and perform a coordinated reset. This approach assumes that the time necessary to send and receive message is sufficiently small (possible negligible) so that the message lag time does not substantially detract from the value of the sharing of edges and ranges.

Many implementations may be used for UASs to share edge and/or range information. In one embodiment, each UAS may iteratively (or according to some other pattern) exchange range and edge information with each other UAS in the swarm. In another embodiment, a UAS $U_p$ may send a request message to $U_q$, requesting for $U_q$ to send to $U_p$ any edge and/or range information that $U_q$ has but $U_p$ does not have. This may be accomplished, for example, by $U_p$ sending to $U_q$, in $U_p$'s request, the highest edge index of which $U_p$ is aware for each UAS in the swarm (assuming that $U_p$ has a lower-indexed edges). Upon receipt of $U_p$'s request, $U_q$ may check its records and, upon a determination that $U_q$ has edge information that $U_p$ does not have, $U_q$ may respond by sending to $U_p$ the edge information that $U_p$ does not have. Similarly, $U_p$ may send to $U_m$ a list or summary of all the range measurements of which $U_p$ is aware for any pair of UASs in the swarm, and $U_q$ may respond by sending to $U_p$ any range measurements of which $U_q$ is aware but $U_p$ is not.

In one embodiment, UASs may attempt communications with each other on a set schedule, e.g., with a frequency of at least one range measurement between each unique pair of UASs per time period. For example, the UASs in a swarm may attempt, for each unique paid of UASs, to share a range measurement and performed a coordinated reset at least once every 10.0 seconds. In other embodiments, UASs may be configured to share information and perform coordinated resets as frequently as possible, although this may be limited by the available communications bandwidth. In another embodiment, the frequency with which UASs share range measurements and perform coordinated resets may depend on perceived pose graph accuracy, known environmental conditions, or on any other factor that may affect the need or ability to share edge and/or range measurement information. In some embodiments, information about a swarm's edges and range measurements may be shared in conjunction with sharing of a new range measurement (and associated coordinated reset) between two UASs. In other embodiments, information about a swarm's edges and range measurements may be shared independent of sharing of a new range measurement (and associated coordinated reset) between two UASs. In other embodiments, communications may be broadcast instead of limited to pairs of UASs in a swarm.

In some embodiments each UAS may maintain or attempt to maintain, for each other UAS in a swarm, a complete knowledge of every other UAS's back-end pose graph, as well as a complete knowledge of all range measurements between swarm members. Although a subset of swarm edges and range measurements may provide some benefit, the greatest benefit will be realized when a UAS is able to use all swarm edges and range measures to optimize that UAS's back-end pose graph. To maximize each UAS's knowledge of a swarm's edges and range measurements, UAS communications may comprise sharing edge and range measurement information, and updating when new (or previously not received) edge and/or range measurement information is received.

Although in some embodiments UASs in a swarm may each attempt to obtain a complete knowledge of all edges and range measurements for the entire swarm, this system may be de-centralized because all UAS perform similar behaviors and have similar roles. As is known in the art, centralized or partially centralized implementations may also be designed and implemented. In general, in a decentralized implementation, each UAS may perform its own pose graph (global pose) optimization. In some centralized or par centralized implementations, one or more designated UASs may perform some pose graph optimization on behalf of one or more other UASs in the swarm.

FIGS. 3-7 show show an exemplary embodiment of cooperative navigation through range sharing as described herein above. Although the example in FIGS. 3-7 is limited to two UASs for the sake of simplicity, cooperative navigations easily scales to more than two UASs as described herein above.

Figure 3:
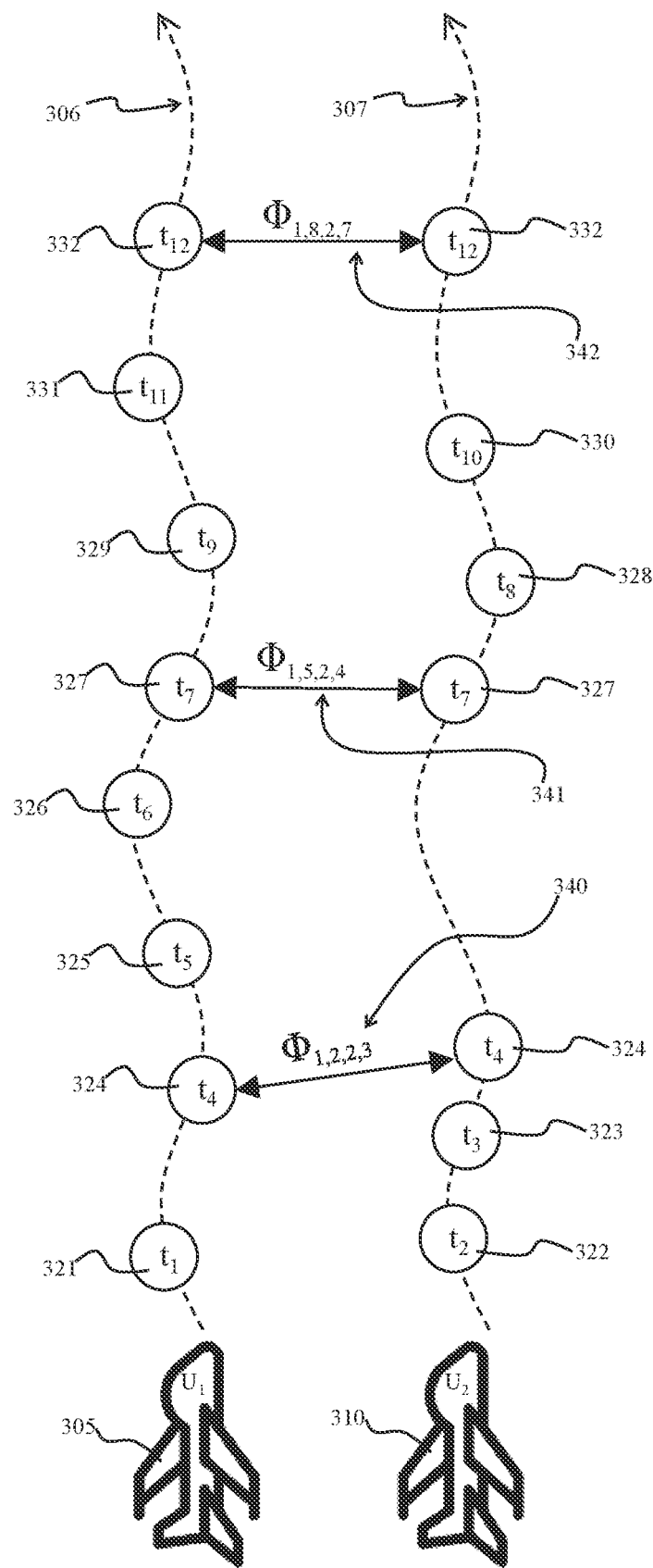
FIG. 3 shows coordinated resets for the flight paths of two UASs.

FIG. 3 shows the general flight paths 306 and 307 of two UASs $U_1$ 305 and $U_2$ 310, respectively. FIG. 3 assumes that both $U_1$ 305 and $U_2$ 310 begin their respective flights along paths 306 and 307 at a time prior to $t_1$—but not necessarily the same time. The times $t_1$-$t_{12}$ are not intended to indicate uniformly spaced time points (i.e., that same amount of time elapsed between $t_1$ and $t_2$ as between $t_2$ and $t_3$, etc.), but are instead intended only to indicate a sequential relationship, i.e., a higher time index occurred after a lower time index (i.e., $t_{n+1}$ is later than $t_n$).

The time points $t_1$-$t_{12}$ (321-32) in the respective flights paths 306 and 307 of UAS $U_1$ 305 and UAS $U_2$ 310 show the times at which the respective UASs performed reset steps, i.e., passing delta pose and associated covariance to the back end and zeroing out the front end's delta pose and covariance. At times $t_4$ (324), $t_1$ (327), and $t_{12}$ (332), U1 and U2 share measured range distances $\Phi_{1,2,2,3,d}$ (341), $\Phi_{1,5,2,4d}$ (342), and $\Phi_{1,8,2,7,d}$ (343), respectively.

Figure 4:
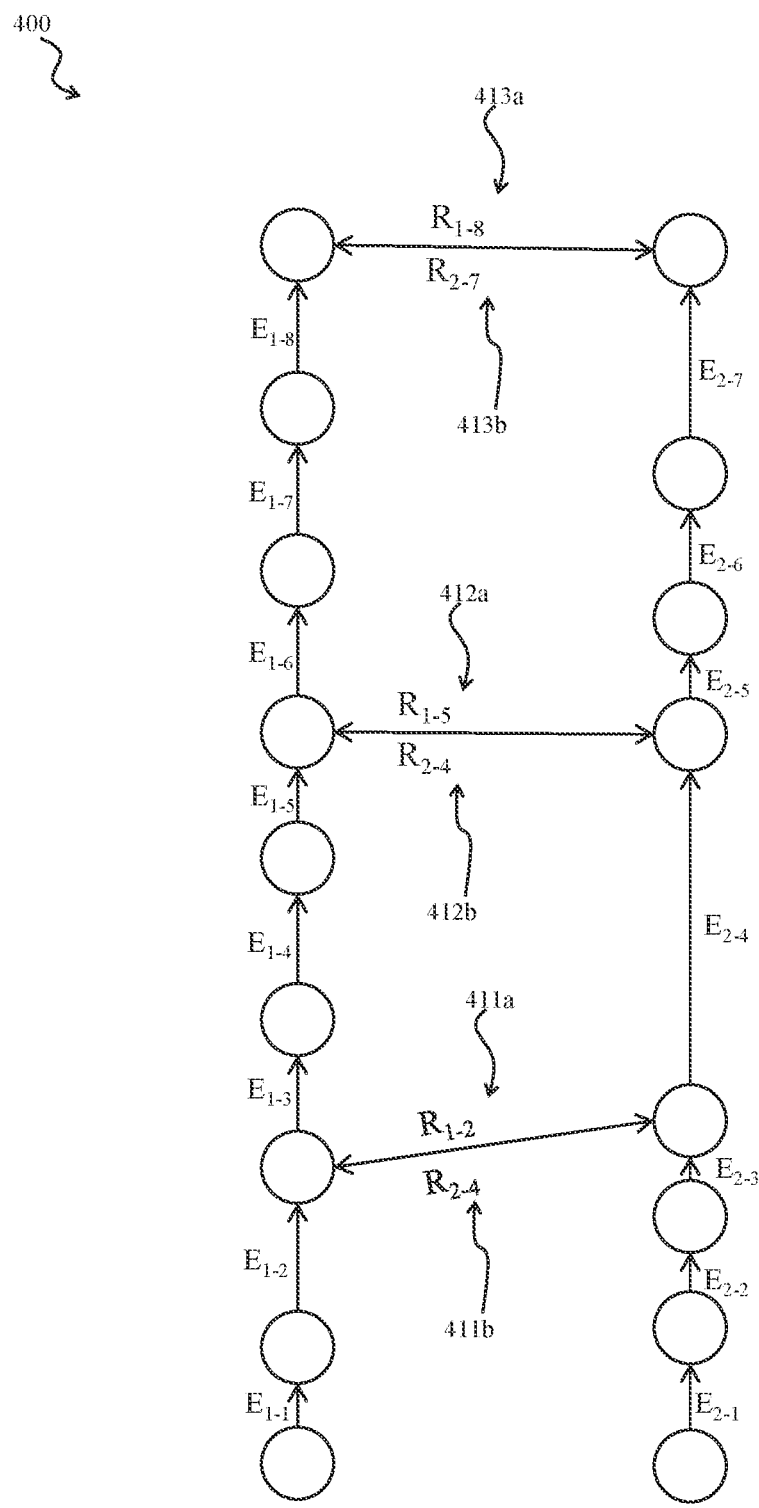
FIG. 4 shows an aggregate pose graph for two UASs engaged to range sharing and coordinated resets.
Figure 5:
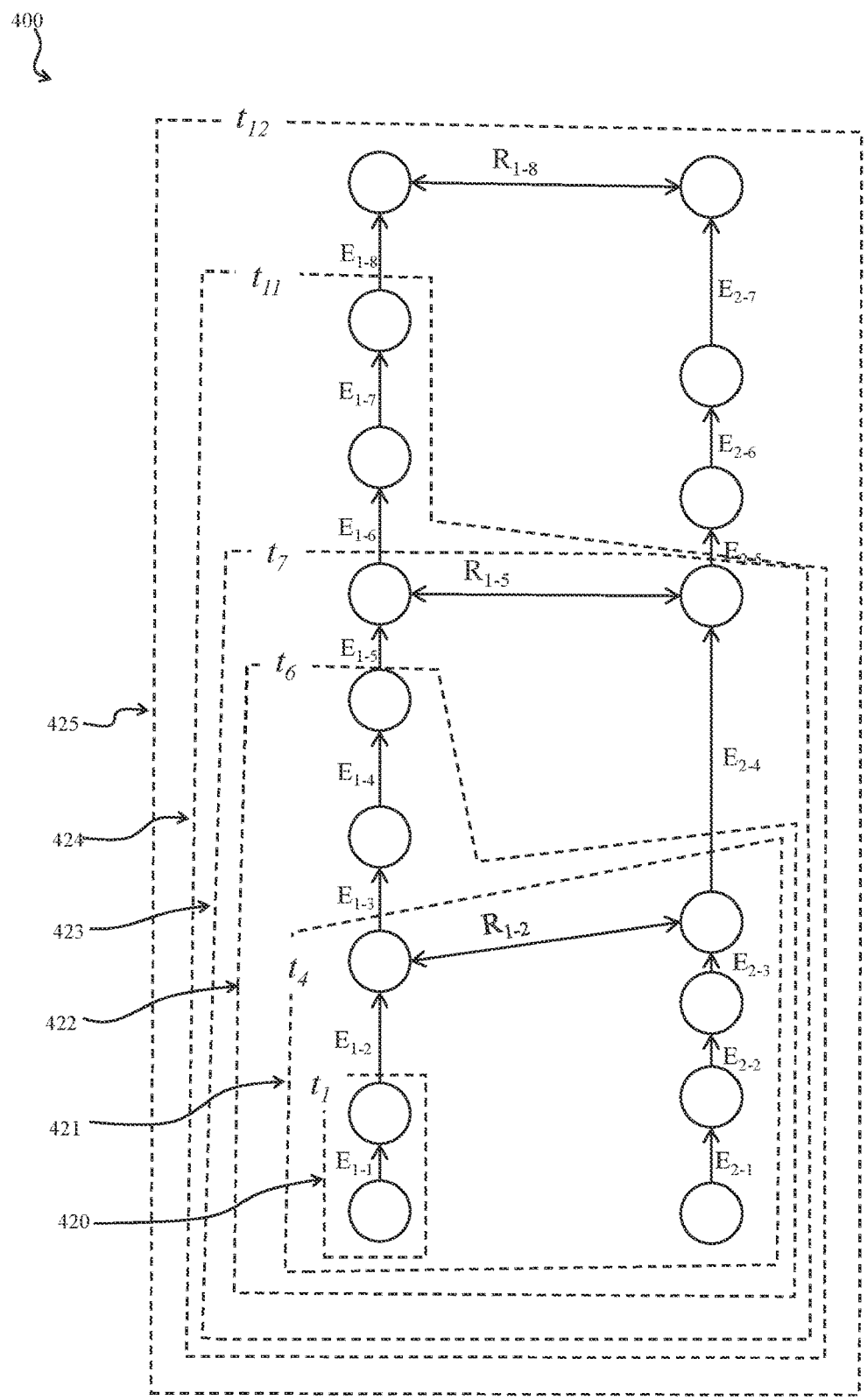
FIG. 5 shows the evolution of a first UAS's aggregate pose graph for a flight using coordinated resets and range sharing.

FIG. 4 shows a combined pose graph 400 at time $t_{12}$ for the flights of $U_1$ and $U_2$ in FIG. 3. Assuming that $U_1$ and $U_2$ performed resets as shown in FIG. 3, and that $U_1$ and $U_2$ had performed coordinated resets at $t_4$, $t_7$, and $t_{12}$ as shown in FIG. 3, and that $U_1$ and $U_2$ had shared all of each's pose graph with the other, the respective back ends of $U_1$ and $U_2$ would have the pose graph shown in FIG. 4, except that $U_1$ would have range edges 411a, 412a, and 413a, and $U_2$ would instead have range edges 411b, 412$_b$, and 413b. The counterpart range edges 411a and 411b, 412a and 412b, and 413a and 413b are essentially identical, except that 411a, 412a, and 413a are formatted from $U_1$'s perspective, and 411b, 412$_b$, and 413b are formatted from $U_2$'s perspective.

As shown in FIGS. 3 and 4, $U_1$ created delta pose edges $E_{1-1}$, $E_{1-3}$, $E_{1-4}$, $E_{1-6}$, and $E_{1-7}$ by performing asynchronous resets independent of $U_2$. $U_2$ created delta-pose edges $E_{2-1}$, $E_{2-2}$, $E_{1-4}$, $E_{2-5}$, and $E_{2-6}$ by performing asynchronous resets independent of $U_1$. $U_1$ created delta-pose edges $E_{1-2}$, $E_{1-5}$, and $E_{1-8}$, as well as range edges $R_{1-2}$ (411a), $R_{1-5}$ (412a), and $R_{1-8}$ (413a) by performing coordinated resets with $U_2$ in response to sharing a range distance with $U_2$. $U_2$ created delta-pose edges $E_{2-3}$, $E_{2-4}$ and $E_{2-7}$, as well as range edges $R_{2-4}$ (411b), $R_{2-4}$ (412b), and $R_{2-7}$ (413c) by performing coordinated resets with $U_2$ in response to sharing a range distance with $U_2$.

FIG. 3 shows $U_1$'s pose graph just before and after each coordinated reset. Subgraph 420 is $U_1$'s pose graph just before the first coordinated reset at $t_4$. Subgraph 421 is $U_1$'s pose graph just after the coordinate reset at $t_4$. Subgraph 422 is $U_1$'s pose graph just before the coordinated reset at $t_7$. Subgraph 423 is $U_1$'s pose graph just after the coordinated reset at $t_7$. Subgraph 424 is $U_1$'s pose graph just before the coordinated reset at $t_{12}$. Subgraph 425 is $U_1$'s pose graph just after the coordinated reset at $t_{12}$.

Figure 6:
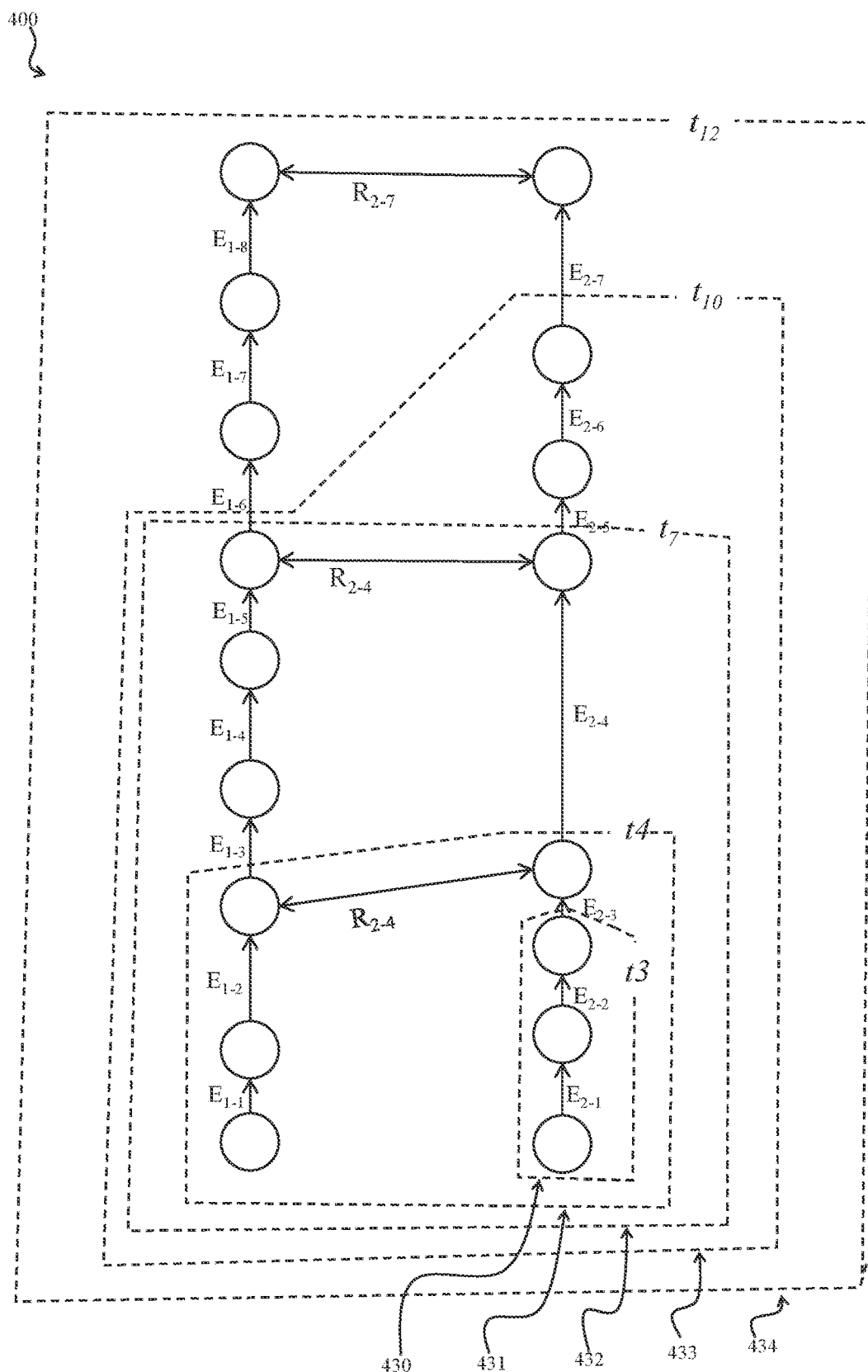
FIG. 6 shows the evolution of a second UAS's aggregate pose graph for a flight using coordinated resets and range sharing.

FIG. 6 shows $U_2$'s pose graph just before and after each coordinated reset. Subgraph 430 is $U_2$'s pose graph just before the first coordinated reset at $t_4$. Subgraph 431 is $U_2$'s pose graph just after the coordinates reset at $t_4$, and just just before the coordinated reset at $t_7$. Subgraph 432 is $U_2$'s pose graph just after the coordinated reset at $t_7$. Subgraph 433 is $U_2$'s pose graph just before the coordinated reset at $t_{12}$. Subgraph 434 is $U_2$'s pose graph just after the coordinated reset at $t_{12}$.

FIG. 7 shows the front-end delta poses (and covariances) for $U_1$ and $U_2$ at times $t_1$-$t_{12}$ for the flight paths and pose graphs in FIG. 3-6. FIG. 7 also shows the edges created by U1 and U2 at each time $t_1$-$t_{12}$. The notation "(Ø, Ø, Ø, [Ø])" indicates a non-zero delta-pose and associated covariance. The notation "(Ø, Ø, Ø, [Ø])→(0,0,0, [0])" indicates a reset step, i.e., the nonzero delta pose and covariance ($\Delta_x$, $\Delta y$, $\Delta_\psi$, $\sigma^2$) were published as an edge to the back-end pose graph and then zeroed out.

Although the example in FIGS. 3-7 is simplified for two UASs, it is easily applied to additional UASs. Many implementations for range sharing may be used, without departing from the scope of the invention here: A, first UAS may improve its back-end global pose-graph optimization by receiving a range distance measurement to a second UAS, receiving a relative anchor from the second UAS, and incorporating this formation as a constraint into the first UAS's pose graph. A relative anchor may be any node from the second UAS's pose graph, e.g., an origin indicating a starting position relative to the first UAS's starting position. When a swarm of UASs repeatedly share range information in this manner, pose graph optimization for each UAS in the swarm (or at least some of the UASs in the swarm), may be improved.

Figure 10:
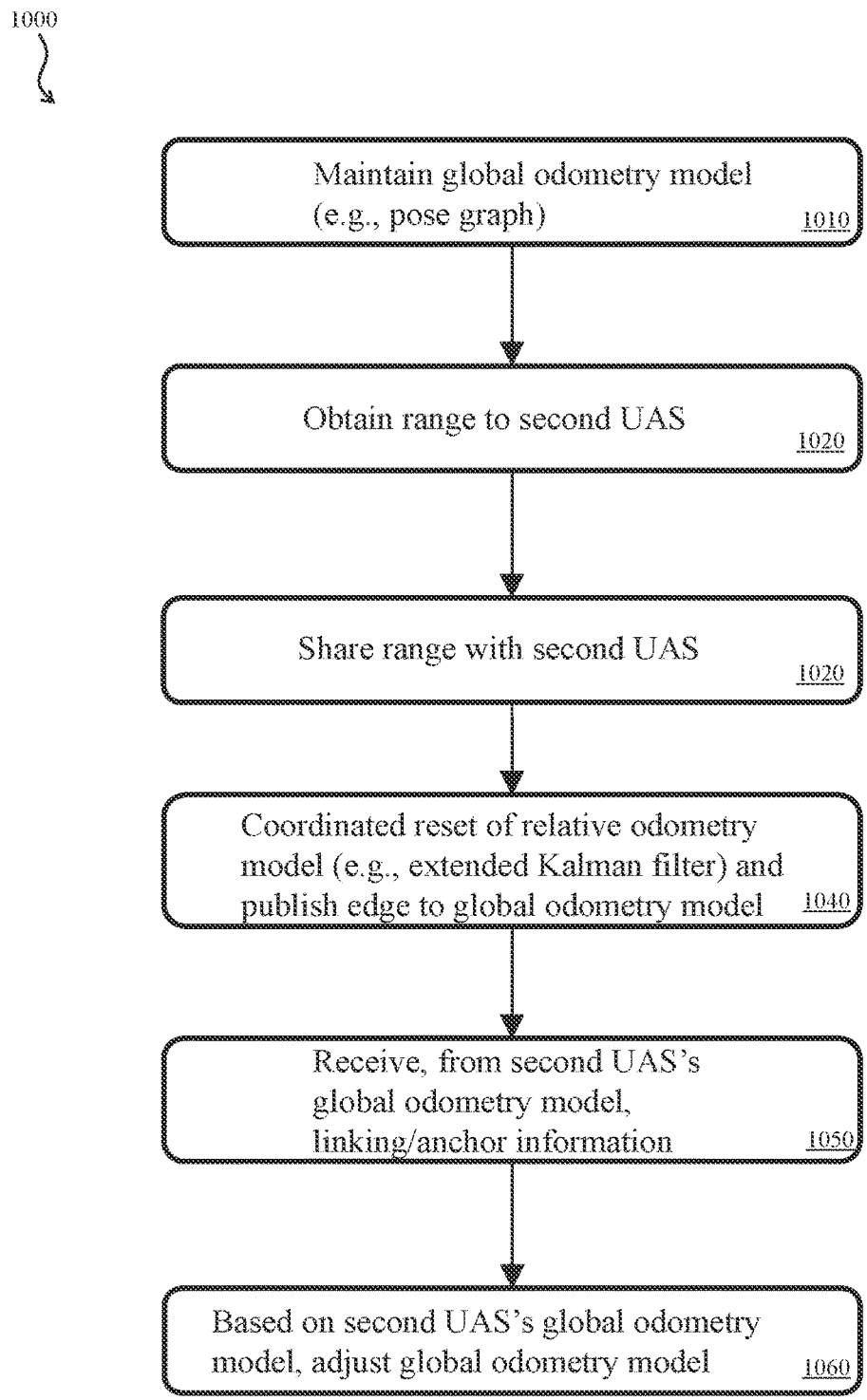
FIG. 10 shows a flow chart for an exemplary embodiment of range sharing and coordinated reset.

FIG. 10 is a flow chart showing an exemplary method for cooperative navigation through range sharing as described herein. At step 1010, a UAS maintains a global odometry model, e.g., a pose graph. At step 1020, the UAS obtains a range to a second UAS. At step 1030, the UAS shares the range with the second UAS. At step 1040, the DAS and second UAS perform a coordinated reset and add an edge to their respective global pose models (e.g., pose graphs). At step 1050, the UAS receives linking/anchor information from the second UAS's global odometry model. At 1060, based on the linking/anchor information received from the second UAS, the UAS adjusts its global odometry model.

Global Pose Optimization

It should be noted that, in general, for a first UAS $U_1$ to use a range measurement to a second UAS $U_2$ for optimization of $U_1$'s back-end pose graph, it is necessary for $U_1$ to have knowledge (or at least an estimate) of the relative spatial relationship between at least one node in $U_1$'s pose graph and one node on $U_2$'s pose graph. This may be referred to as an "anchor." $U_2$ may provide this information to $U_1$ through the inter-UAS message-sharing communications described herein.

In one embodiment, in which back-end information (e.g., global pose) is represented as a pose graph, a UAS may be configured to optimize its pose graph to improve its accuracy and the accuracy of the UAS's estimated global pose. In theory, as additional information or constraints are added to a pose graph, or to a pose graph optimization model or algorithm, the accuracy of the pose graph's estimated global pose improves. In general, optimizing a pose graph is a nonlinear unconstrained optimization problem. Pose graph optimization is one type of nonlinear unconstrained optimization, with features specific to a pose graph. Many approaches and tools are known and available for nonlinear unconstrained optimization. One such tool is GTSAM, a software library that includes tools and solutions for pose graph optimization. GTSAM is one tool that may be used to optimize the pose graph as described herein. As of Apr. 7, 2021, GTSAM is available at leat at https://gtsamorg. See also https://roboticsconference.org/docs/keynote-TestOf-Time-DellaertKaess.pdf.

In some embodiments, global pose may be modeled, predicted, and optimized using a model or approach other than a pose graph. In general, this type of problem is known as a nonlinear unconstrained optimization problem. This genre of problems and models are well-known and researched. General nonlinear unconstrained optimization solvers include, but are not limited to, Levenberg-Marquardt, Google's ceres solver, and many others.

Although the disclosure herein focuses on unmanned aircraft or other vehicles, the systems and methods disclosed herein could be applied for manned or partially manned aircraft or vehicles.

What is claimed is:

1. A method for improving navigation of an aircraft system, comprising:
   receiving, from one or more sensors, sensor data reflecting movement of the aircraft system relative to one or more ground features;
   estimating, based on the sensor data, and using a relative odometry model, at least one of the following: an estimated change in x,y position since an earlier reset time, and an estimated change in yaw angle since an earlier reset time;
   determining, based on a reset criteria, to reset the relative odometry model, wherein resetting the relative odometry model comprises at least one from the following list:
      setting the estimated change in x,y position since the earlier reset time to zero; and
      setting the estimated change in yaw angle since the earlier reset time to zero;
   publishing to a global odometry model a relative odometry update comprising at least one of the following: the estimated change in x,y position since the earlier reset time, and the estimated change in yaw angle since the earlier reset time;
   resetting the relative odometry model;
   incorporating the relative odometry update into the global odometry model as a constraint on at least one of the following: global x,y position and global yaw angle;
   estimating global pose information in the global odometry model by applying nonlinear unconstrained optimization; and
   using two or more global constraints to calculate scale bias and to distribute a scale bias correction over at least two relative odometry constraints.

2. A method for improving navigation of an aircraft system, comprising:
   receiving, from one or more sensors, sensor data reflecting movement of the aircraft system relative to one or more ground features;
   estimating, based on the sensor data, and using a relative odometry model, at least one of the following: an estimated change in x,y position since an earlier reset time, and an estimated change in yaw angle since an earlier reset time;
   determining, based on a reset criteria, to reset the relative odometry model, wherein resetting the relative odometry model comprises at least one from the following list:
      setting the estimated change in x,y position since the earlier reset time to zero; and
      setting the estimated change in yaw angle since the earlier reset time to zero;
   publishing to a global odometry model a relative odometry update comprising at least one of the following: the estimated change in x,y position since the earlier reset time, and the estimated change in yaw angle since the earlier reset time;
   resetting the relative odometry model;
   incorporating the relative odometry update into the global odometry model as a constraint on at least one of the following: global x,y position and global yaw angle;
   estimating global pose information in the global odometry model by applying nonlinear unconstrained optimization; and
   using two or more global constraints to calculate scale bias and to distribute a scale bias correction over at least two relative odometry constraints;
   wherein the global odometry model comprises:
      one or more relative odometry constraints based on one or more relative odometry updates; and
      one or more estimates of global x,y position and/or yaw angle based on the one or more relative odometry constraints; and
   further comprising:
      simultaneously:
         obtaining a range to a second aircraft having a second-aircraft global odometry model;
         sharing the range with the second aircraft;
         resetting the relative odometry model and publishing a relative odometry update to the global odometry model;
      receiving, from the second-aircraft global odometry model, information for linking the global odometry model to the second-aircraft odometry model; and
      based on the information received from the second-aircraft global odometry model, adjusting the global odometry model.

3. The method of claim 2, further comprising incorporating into the global odometry model the entirety of the second aircraft's global odometry model.

4. The method of claim 2, comprising receiving, from the second aircraft, a segment of a third aircraft's global odometry model, and using the segment of the third aircraft's odometry model to adjust the global odometry model.

5. A method for improving navigation of an aircraft system, comprising:
   maintaining a global odometry model comprising a pose graph, the pose graph comprising delta-pose edges and global-pose-estimate nodes;
   simultaneously:
      obtaining a range to a second aircraft having a global odometry model;
      sharing the range with the second aircraft;
      resetting a relative odometry model and publishing a relative odometry update to the global odometry model;
   receiving, from the second aircraft's global odometry model, information for linking the global odometry model to the second aircraft's odometry model;

based on the information received from the second aircraft's global odometry model, adjusting the global odometry model estimating global pose information in the global odometry model by applying nonlinear unconstrained optimization; and using two or more global constraints to calculate scale bias and to distribute a scale bias correction over at least two relative odometry constraints.

* * * * *